US012755722B2

(12) United States Patent
Wnorowski et al.

(10) Patent No.: US 12,755,722 B2
(45) Date of Patent: Oct. 6, 2026

(54) COIL SWITCHING CONTROL SYSTEM FOR AN ELECTRIC GUITAR

(71) Applicants: Thomas F. Wnorowski, Romulus, MI (US); Gary Morgan, Canton, MI (US)

(72) Inventors: Thomas F. Wnorowski, Romulus, MI (US); Gary Morgan, Canton, MI (US)

(73) Assignee: Thomas F. Wnorowski, Romulus, MI (US)

( * ) Notice: Subject to any disclaimer, the term of this patent is extended or adjusted under 35 U.S.C. 154(b) by 0 days.

(21) Appl. No.: 19/425,948

(22) Filed: Dec. 18, 2025

(65) Prior Publication Data

US 2026/0179597 A1 Jun. 25, 2026

Related U.S. Application Data

(60) Provisional application No. 63/833,598, filed on Dec. 19, 2024.

(51) Int. Cl.
*G10H 3/18* (2006.01)
*G10H 1/46* (2006.01)

(52) U.S. Cl.
CPC ............... *G10H 3/181* (2013.01); *G10H 1/46* (2013.01); *G10H 3/182* (2013.01); *G10H 2220/505* (2013.01)

(58) Field of Classification Search
CPC .. G10H 1/02; G10H 1/06; G10H 1/14; G10H 1/18; G10H 1/32; G10H 3/12; G10H 3/18–182; G10H 3/186; G10H 2220/461; G10H 2220/505
See application file for complete search history.

(56) References Cited

U.S. PATENT DOCUMENTS

| | | | | |
|---|---|---|---|---|
| 3,290,424 | A | 12/1966 | Fender | |
| 4,164,163 | A | 8/1979 | Rhodes | |
| 4,305,320 | A | 12/1981 | Peavey | |
| 4,524,667 | A * | 6/1985 | Duncan | G10H 3/181 984/368 |

(Continued)

FOREIGN PATENT DOCUMENTS

| | | |
|---|---|---|
| GB | 2207542 | 2/1989 |
| GB | 2407688 | 5/2005 |
| WO | 1991010989 | 7/1991 |

*Primary Examiner* — Christopher Uhlir
(74) *Attorney, Agent, or Firm* — Mastrogiacomo PLLC; Patrick Mastrogiacomo, Jr.

(57) ABSTRACT

A coil switching control system for an electric guitar, comprising a first rotary switch, the first rotary switch controls a neck humbucker multi-coil pickup, a second rotary switch, the second rotary switch controls a bridge humbucker multi-coil pickup, a first push pull potentiometer, the first push pull potentiometer controls a volume, a second push pull potentiometer the second push pull potentiometer controls a tone and an electrical circuit connecting the first multi-position rotary switch to the neck humbucker multi-coil pickup, the second multi-position rotary switch to the bridge humbucker multi-coil pickup, the first push-pull potentiometer and the second push-pull potentiometer to an output amplifier, the combination of the multi-position rotary switches and the push-pull potentiometers enables a selection of a multiplicity of coil configurations for the electric guitar to create at least 51 different tonal combinations.

9 Claims, 19 Drawing Sheets

(56) References Cited

U.S. PATENT DOCUMENTS

| | | | | |
|---|---|---|---|---|
| 4,711,149 | A | 12/1987 | Starr | |
| 5,136,918 | A | 8/1992 | Riboloff | |
| 5,136,919 | A | 8/1992 | Wolstein | |
| 5,311,806 | A | 5/1994 | Riboloff | |
| 6,034,316 | A | 3/2000 | Hoover | |
| 6,121,537 | A | 9/2000 | Pawar et al. | |
| 6,781,050 | B2 | 8/2004 | Olvera et al. | |
| 6,998,529 | B2 | 2/2006 | Wmorowski | |
| 7,022,909 | B2 | 4/2006 | Kinman | |
| 7,276,657 | B2 * | 10/2007 | Bro | G10H 1/18<br>84/723 |
| 7,994,413 | B2 * | 8/2011 | Salo | G10H 3/181<br>84/728 |
| 7,999,171 | B1 | 8/2011 | Hamilton | |
| 8,445,770 | B2 * | 5/2013 | Jacob | G10H 3/186<br>326/38 |
| 8,546,677 | B2 | 10/2013 | Haddad | |
| D737,891 | S | 9/2015 | Naylor | |
| D746,253 | S | 12/2015 | Fishman | |
| 9,401,134 | B2 | 7/2016 | Baker | |
| 9,514,727 | B2 | 12/2016 | Liptac | |
| 9,524,710 | B2 | 12/2016 | Mills | |
| D781,953 | S | 3/2017 | Akins | |
| 9,601,100 | B1 | 3/2017 | Dixon | |
| 9,734,811 | B2 | 8/2017 | Haddad | |
| 10,115,383 | B2 | 10/2018 | Shaw et al. | |
| 10,380,986 | B2 * | 8/2019 | Baker | G10H 1/06 |
| 11,380,295 | B2 * | 7/2022 | Hoover | G10H 3/182 |
| 2006/0156912 | A1 * | 7/2006 | Annis | G10H 3/182<br>84/742 |
| 2021/0151022 | A1 | 5/2021 | Hoover | |
| 2025/0239244 | A1 * | 7/2025 | Lewry | G10H 3/188 |

* cited by examiner

26

COIL SWITCHING CONTROL SYSTEM FOR AN ELECTRIC GUITAR

CROSS REFERENCE TO RELATED APPLICATIONS

This patent application claims the benefit of priority based on U.S. Provisional Patent Application No. 63/833,598 filed on Dec. 19, 2024, which is incorporated by reference in its entirety for all purposes.

STATEMENT REGARDING FEDERALLY SPONSORED RESEARCH OR DEVELOPMENT

Not Applicable

INCORPORATION-BY-REFERENCE OF MATERIAL SUBMITTED ON COMPACT DISC

Not Applicable

BACKGROUND OF THE INVENTION

1. Field of the Invention

The present invention relates generally to an electric guitar control system, and more particularly, to a comprehensive pickup coil switching system utilizing multi-position rotary switches, push-pull potentiometers, and slide switches to provide enhanced tonal versatility and user control.

2. Background Art

Electric guitars commonly employ pickup coil switching systems to select different combinations of electromagnetic pickups, thereby altering the instrument's tonal output. Traditional electric guitar designs, such as those described in U.S. Pat. No. 3,290,424, utilize simple toggle switches or three-position blade switches to select between neck, bridge, or combined pickup configurations. While effective for basic tonal variations, these systems are limited in their ability to access complex coil combinations or provide dynamic control over pickup wiring configurations. More advanced systems, such as those disclosed in U.S. Pat. No. 5,136,919, incorporate rotary switches to expand pickup selection options; however, these often require multiple control elements, increasing complexity and reducing user accessibility during performance. Additionally, push-pull potentiometers, as seen in some aftermarket modifications, allow for coil splitting or phase reversal but are typically limited to binary functions and lack integration with other switching mechanisms. Existing slide switches in guitar controls, such as those in certain multi-pickup designs, are generally used for simple on/off functions and do not support intricate coil management. Current systems often fail to provide a unified, intuitive interface that combines multiple switch types to achieve a wide range of tonal configurations without compromising ease of use or requiring extensive rewiring.

Therefore, there is a need for an integrated control system for electric guitars that combines multi-position rotary switches, push-pull potentiometers, and slide switches to enable comprehensive and user-friendly management of pickup coil configurations for enhanced tonal versatility.

BRIEF SUMMARY OF THE INVENTION

The present invention provides a comprehensive pickup coil switching control system for electric guitars, designed to enhance tonal versatility and user control through an integrated combination of multi-position rotary switches, push-pull potentiometers, and a slide switch. The system enables musicians to access a wide range of pickup coil configurations, including series, parallel, split, and phase-reversed arrangements, within a single, intuitive interface. The multi-position rotary switches allow selection among multiple pickup combinations, while the push-pull potentiometers provide additional functionality, such as coil splitting or phase reversal, without requiring separate controls. The slide switch further enhances flexibility by enabling rapid toggling between predefined tonal modes or pickup groups. Unlike conventional systems, which often rely on limited toggle or blade switches, the present invention offers a unified control scheme that maximizes tonal options while maintaining ease of use during performance. The system is adaptable to various electric guitar designs and pickup configurations, addressing the need for a versatile, user-friendly solution that overcomes the complexity and limitations of existing pickup switching mechanisms.

BRIEF DESCRIPTION OF THE SEVERAL VIEWS OF THE DRAWINGS

The features and inventive aspects of the present invention will become more apparent from the following detailed description, claims, and drawings, of which the following is a brief description:

DETAILED DESCRIPTION OF THE INVENTION

Figure 1:
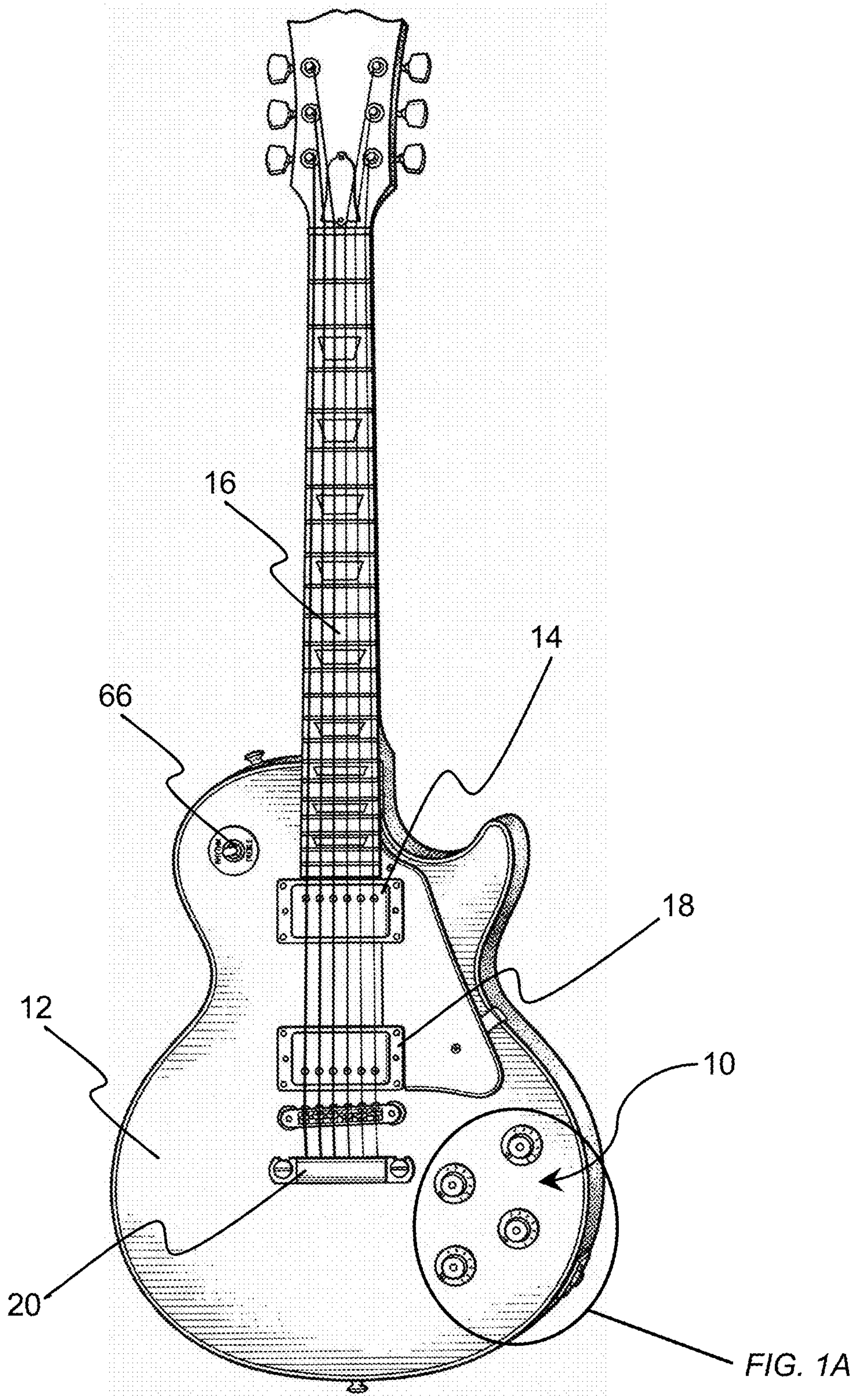
FIG. 1 is a front perspective view of an electric guitar according to an embodiment of the present invention.
Figure 1A:
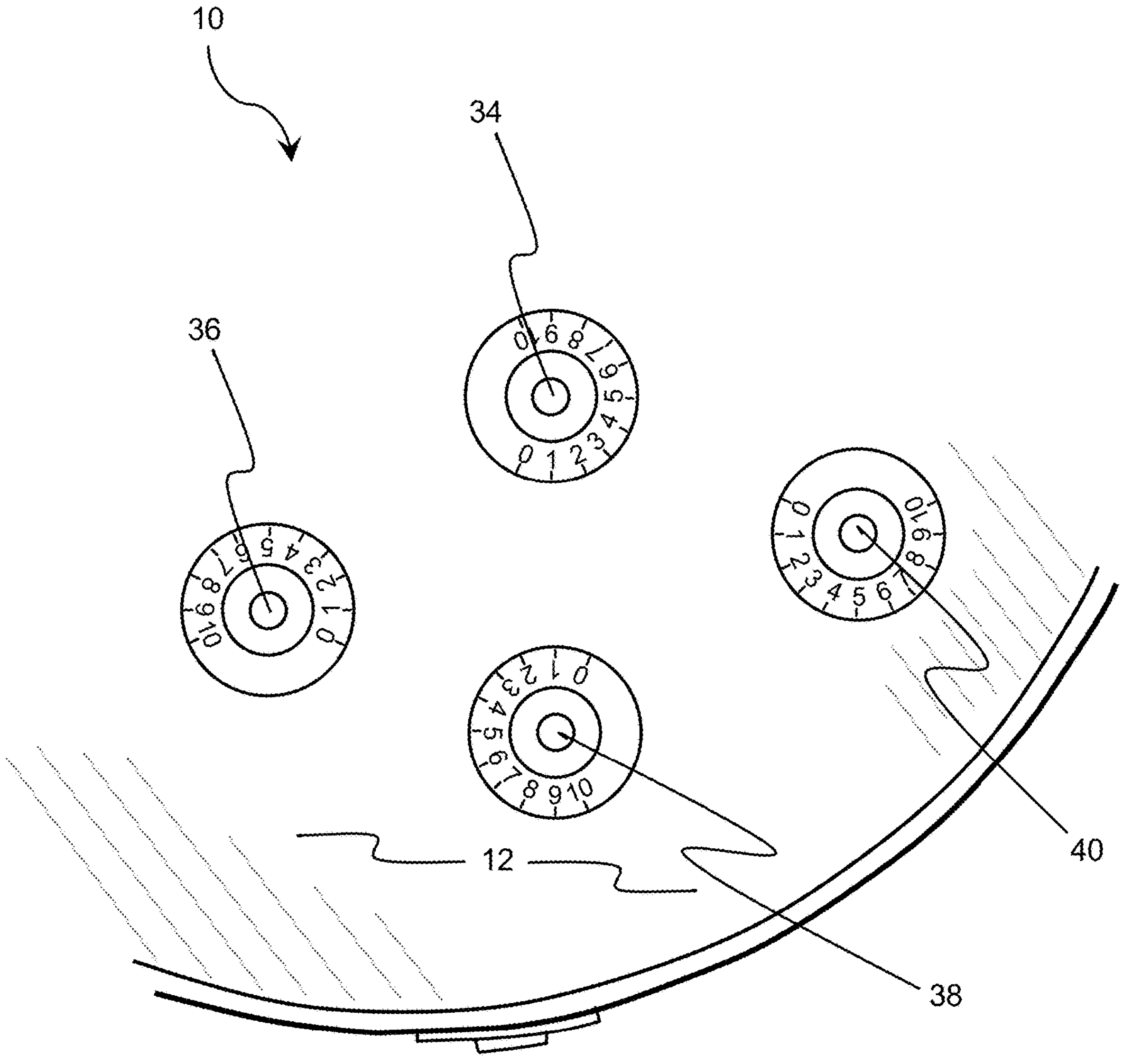
FIG. 1A is an enlarged view of FIG. 1 of rotary switches and push-pull potentiometers of a coil switching control system for the electric guitar according to an embodiment of the present invention.

Referring now to the drawings, preferred illustrative embodiments of the present invention are shown in detail. Although the drawings represent embodiments of the present invention, the drawings are not necessarily to scale and certain features may be exaggerated to better illustrate and explain the present invention. Further, the embodiments set forth herein are not intended to be exhaustive or otherwise to limit or restrict the invention to the precise forms and configurations shown in the drawings and disclosed in the following detailed description.

The present invention transforms the Les Paul electric guitar and similar typical stringed electric instruments with two 4-wire humbucker pickups into a versatile instrument with advanced tonal control capabilities and an increased number of pick-up tones. The advanced tonal control capabilities and increased number of pick-up tones may be produced by the following components when added to a typical electrical guitar.

Figure 2:
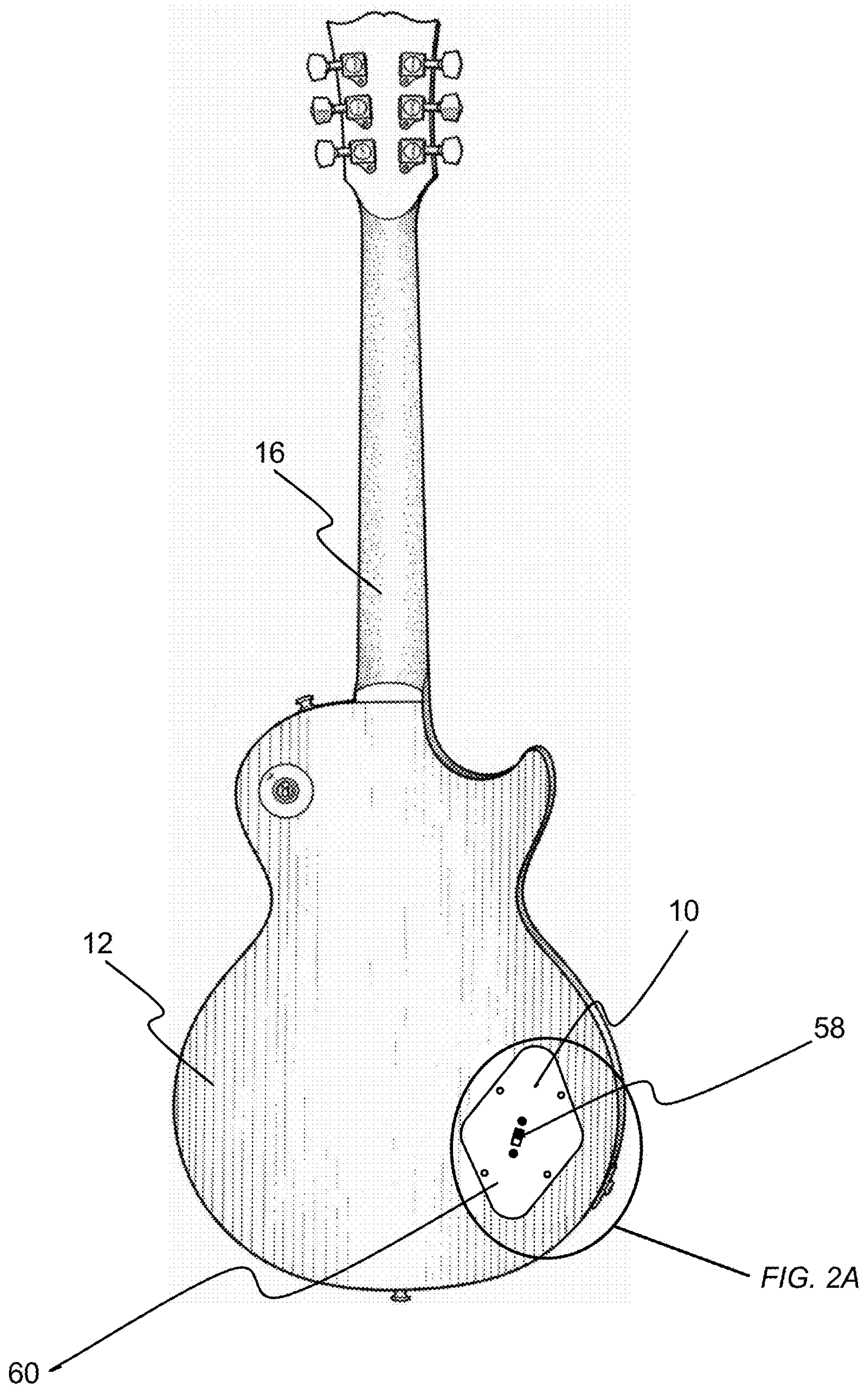
FIG. 2 is a rear perspective view of the electric guitar according to an embodiment of the present invention.
Figure 2A:
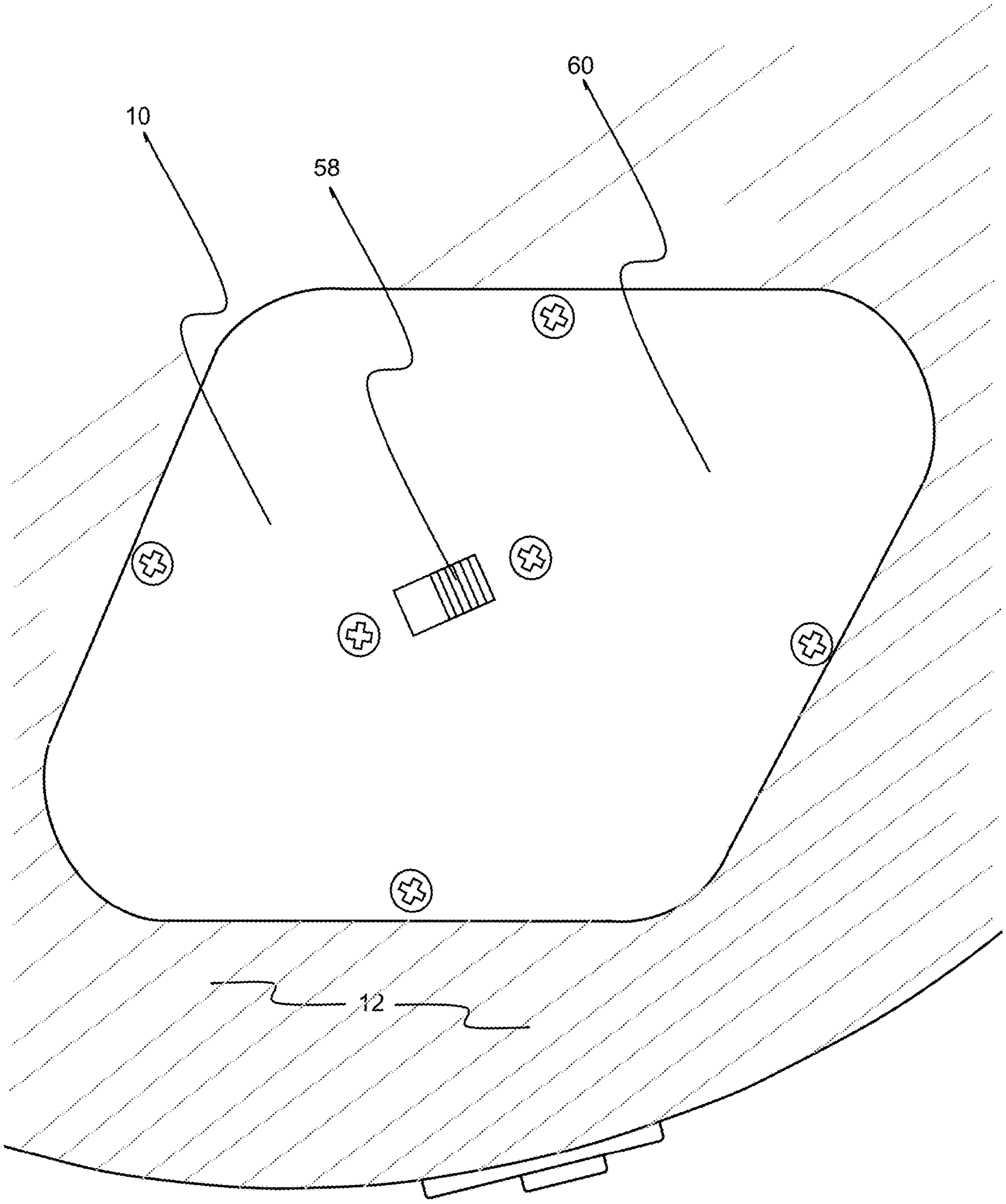
FIG. 2A is an enlarged view of FIG. 2 of a slide switch of the coil switching control system for the electric guitar according to an embodiment of the present invention.
Figure 2B:
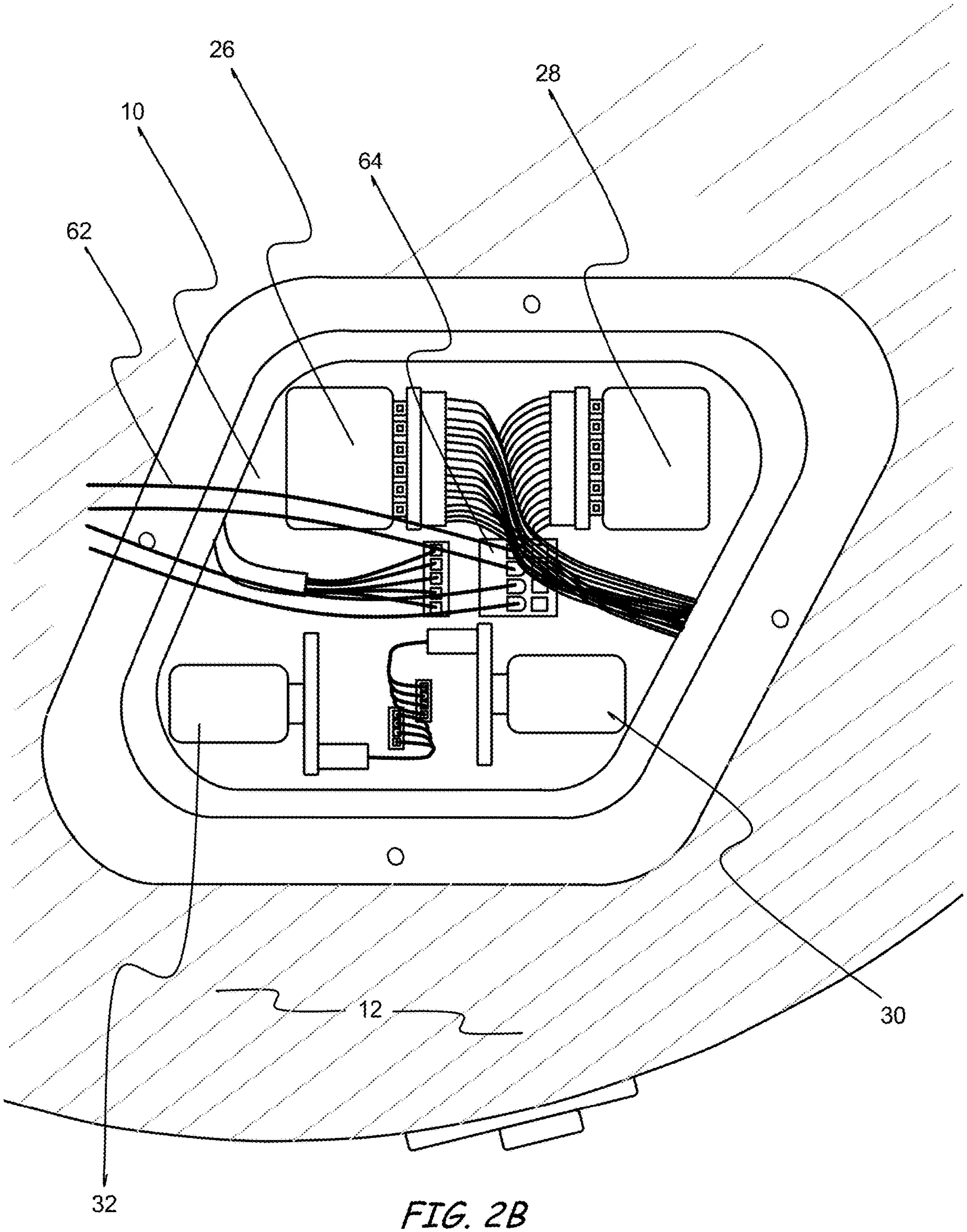
FIG. 2B is a bottom view of the rotary switches and the push-pull potentiometers secured to a printed circuit board with wiring of the coil switching control system for the electric guitar according to an embodiment of the present invention.
Figure 3:
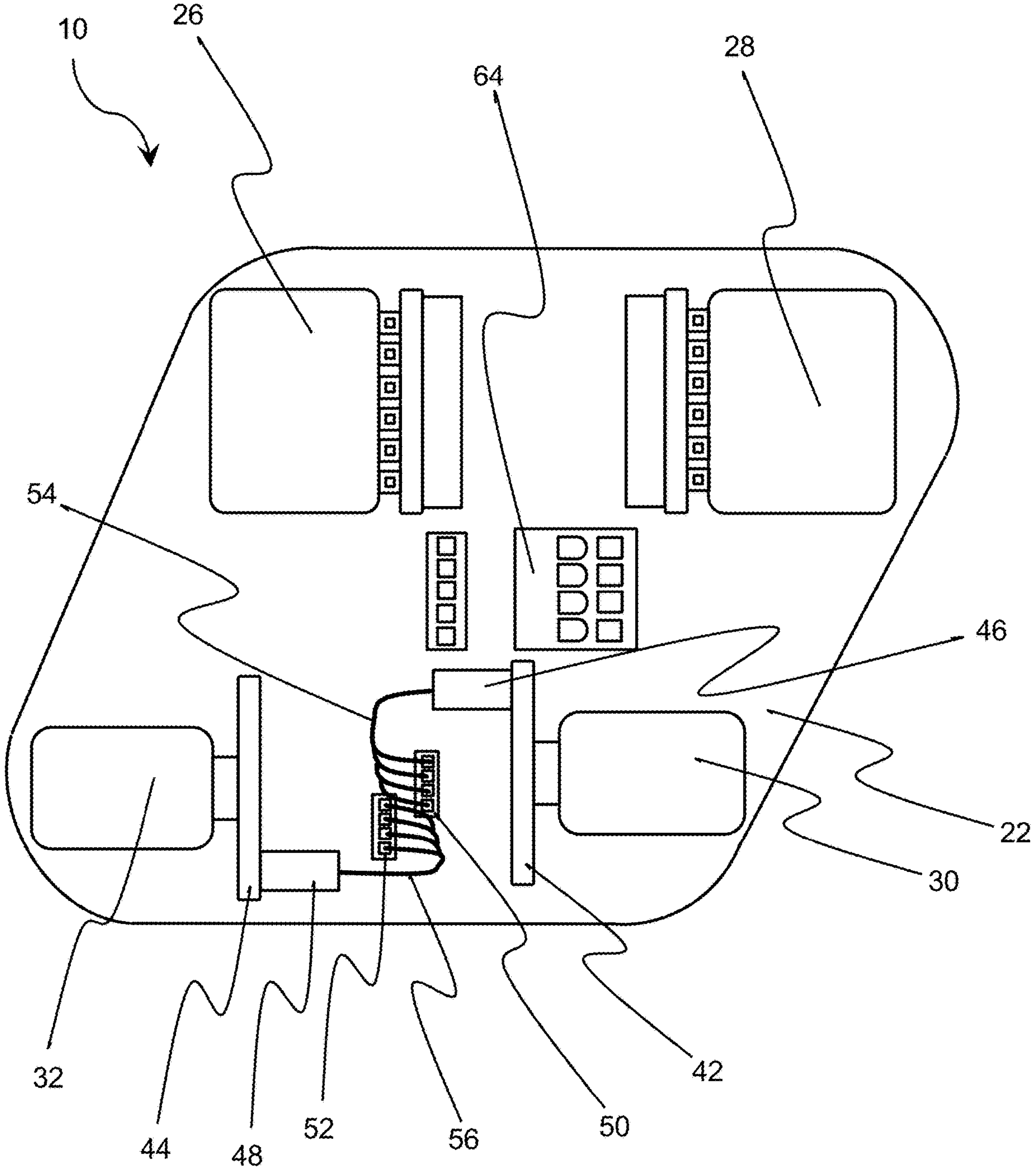
FIG. 3 is a bottom view of the rotary switches and the push-pull potentiometers secured to the printed circuit board of the coil switching control system for the electric guitar according to an embodiment of the present invention.
Figure 4:
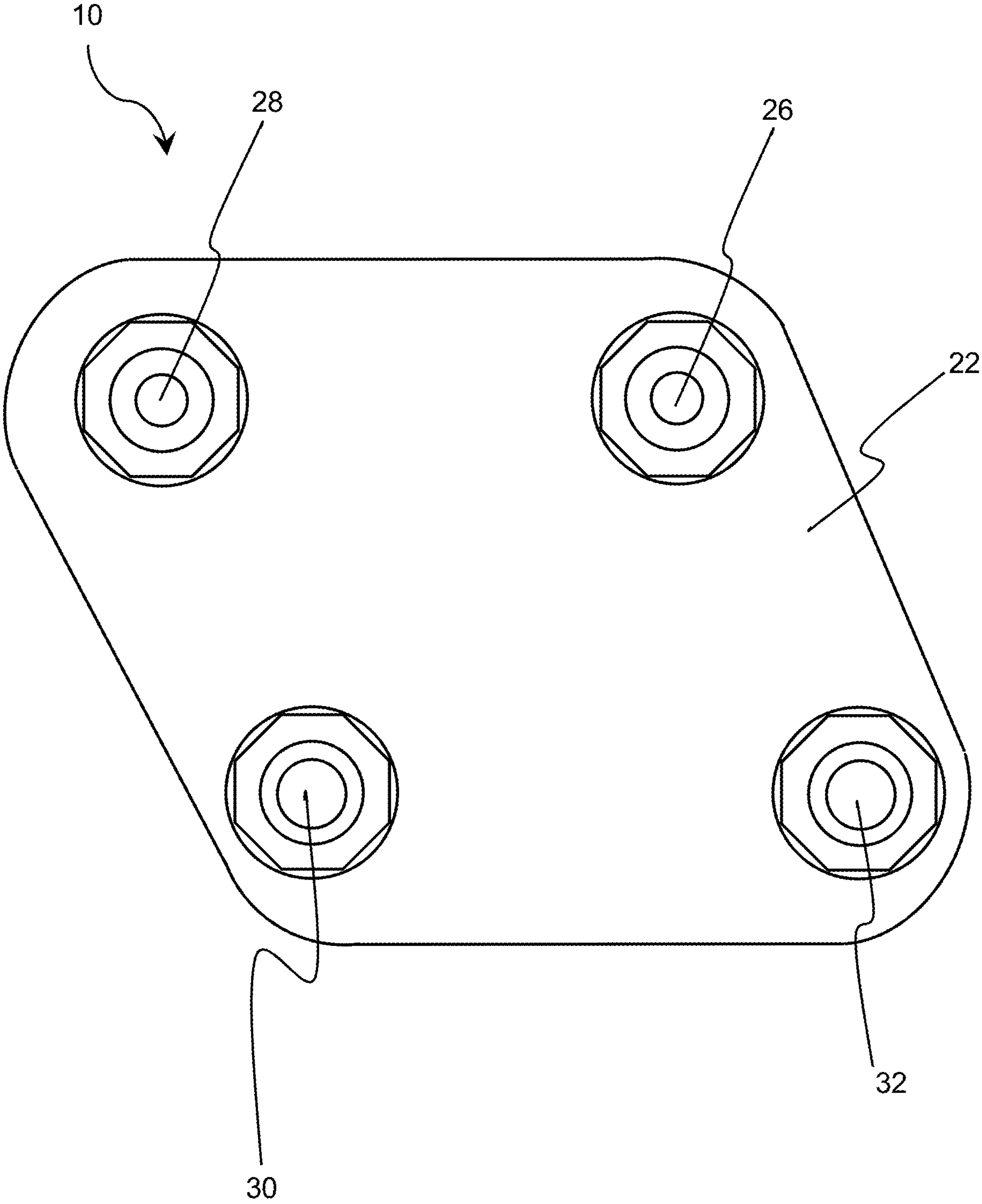
FIG. 4 is a top view of the rotary switches and the push-pull potentiometers secured to the printed circuit board of the coil switching control system for the electric guitar according to an embodiment of the present invention.
Figure 5:
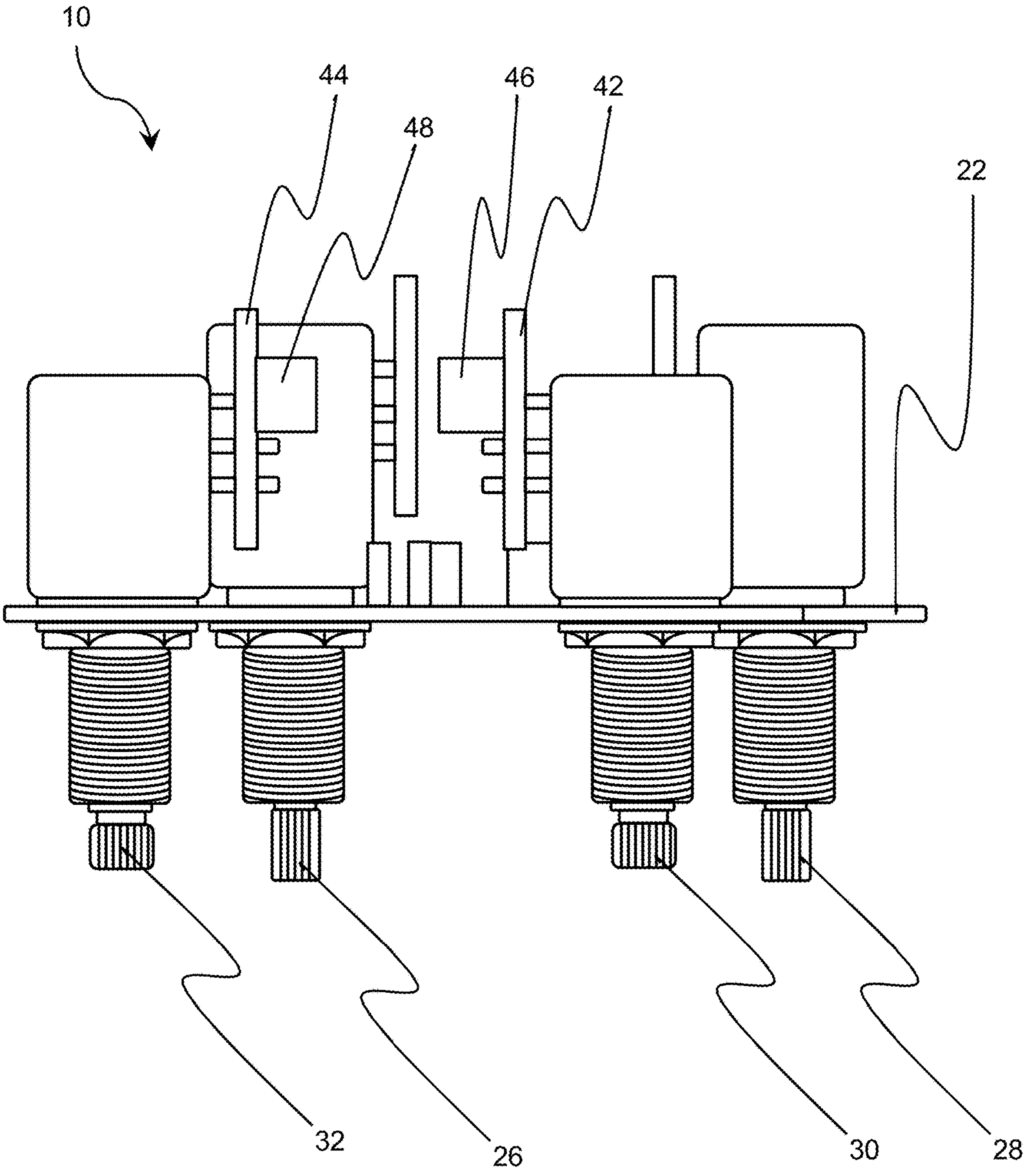
FIG. 5 is a right-side view of the rotary switches and the push-pull potentiometers secured to the printed circuit board of the coil switching control system for the electric guitar according to an embodiment of the present invention.
Figure 6:
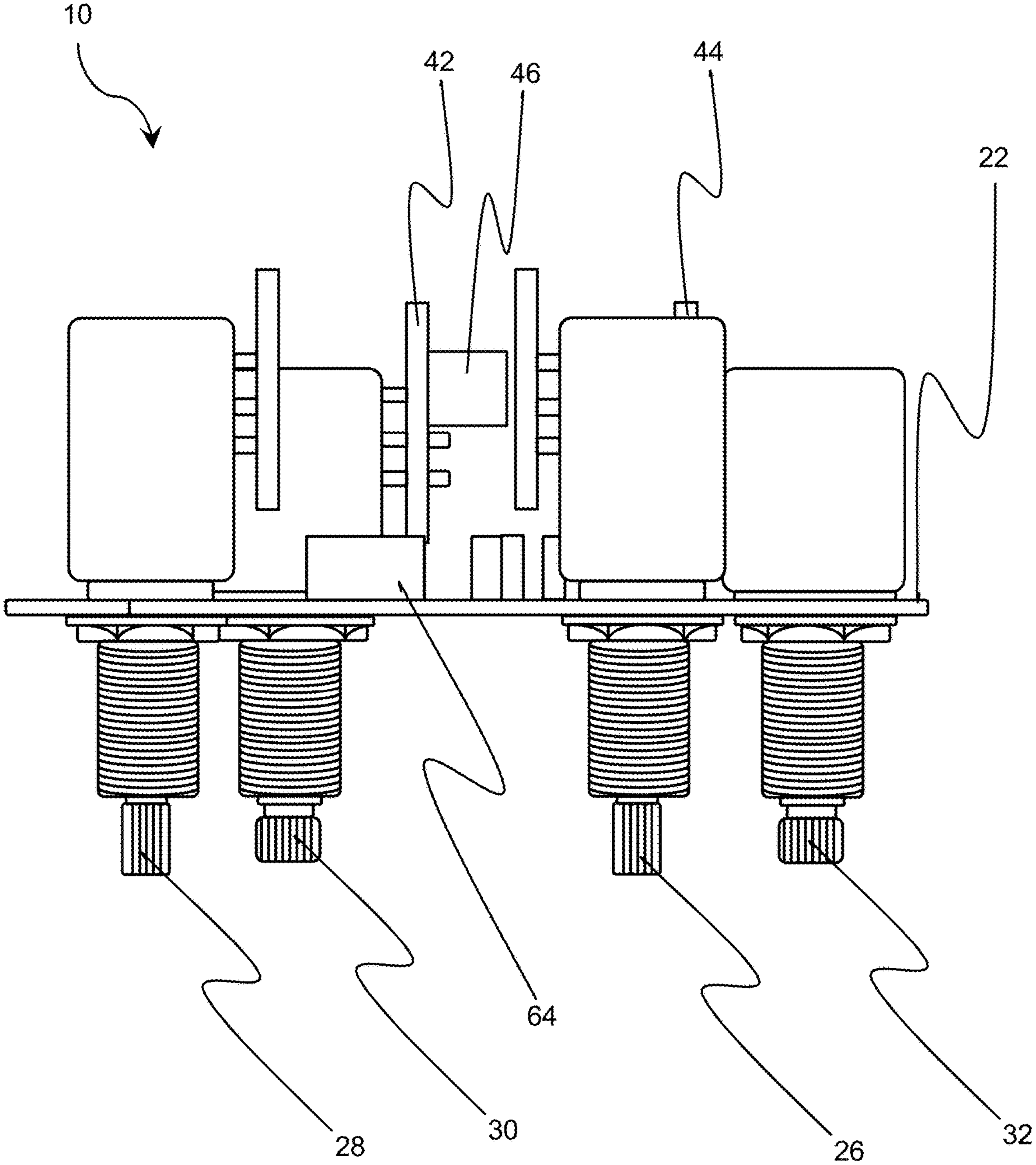
FIG. 6 is a left-side view of the rotary switches and the push-pull potentiometers secured to the printed circuit board of the coil switching control system for the electric guitar according to an embodiment of the present invention.
Figure 7:
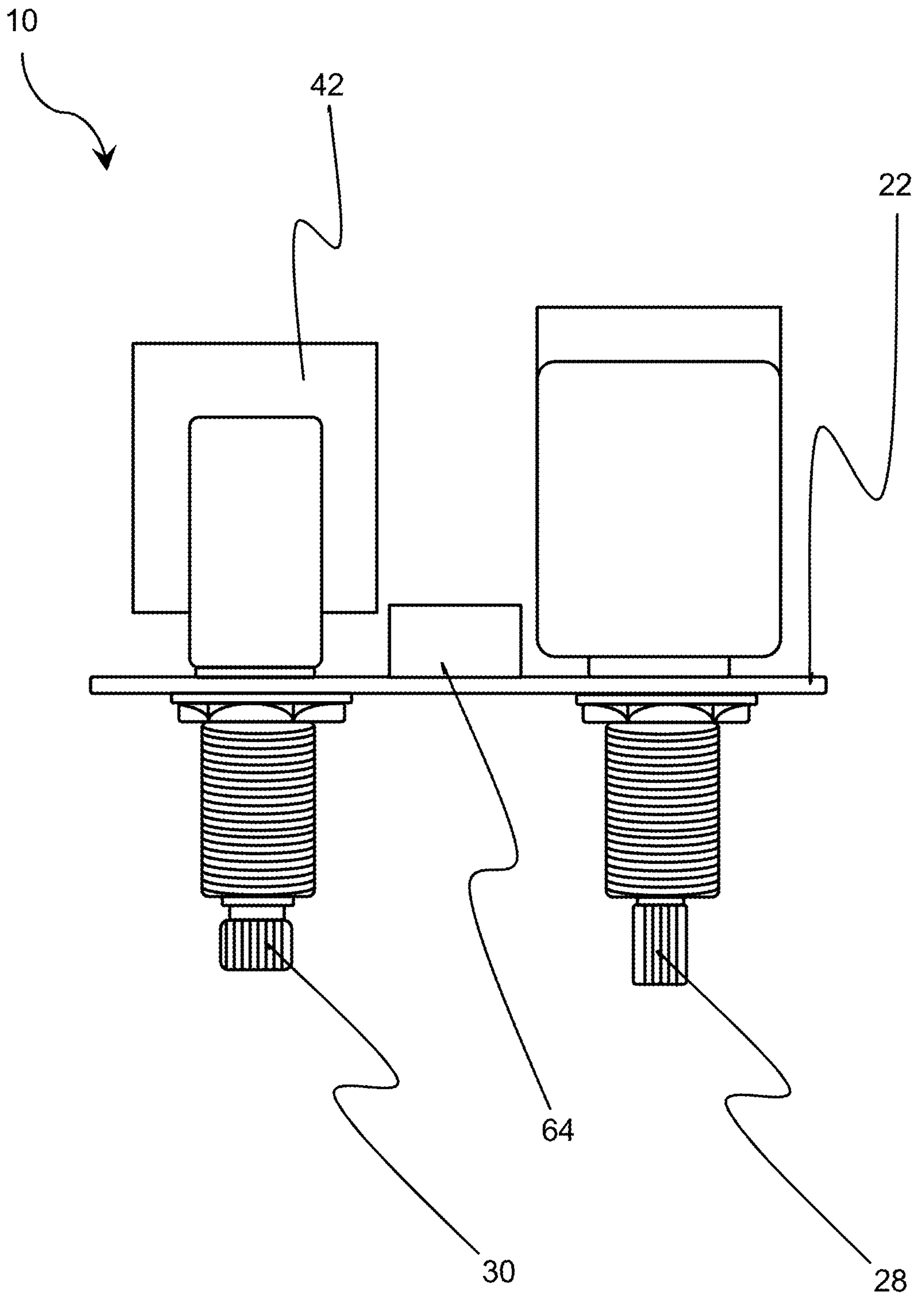
FIG. 7 is a front view of the rotary switches and the push-pull potentiometers secured to the printed circuit board of the coil switching control system for the electric guitar according to an embodiment of the present invention.
Figure 8:
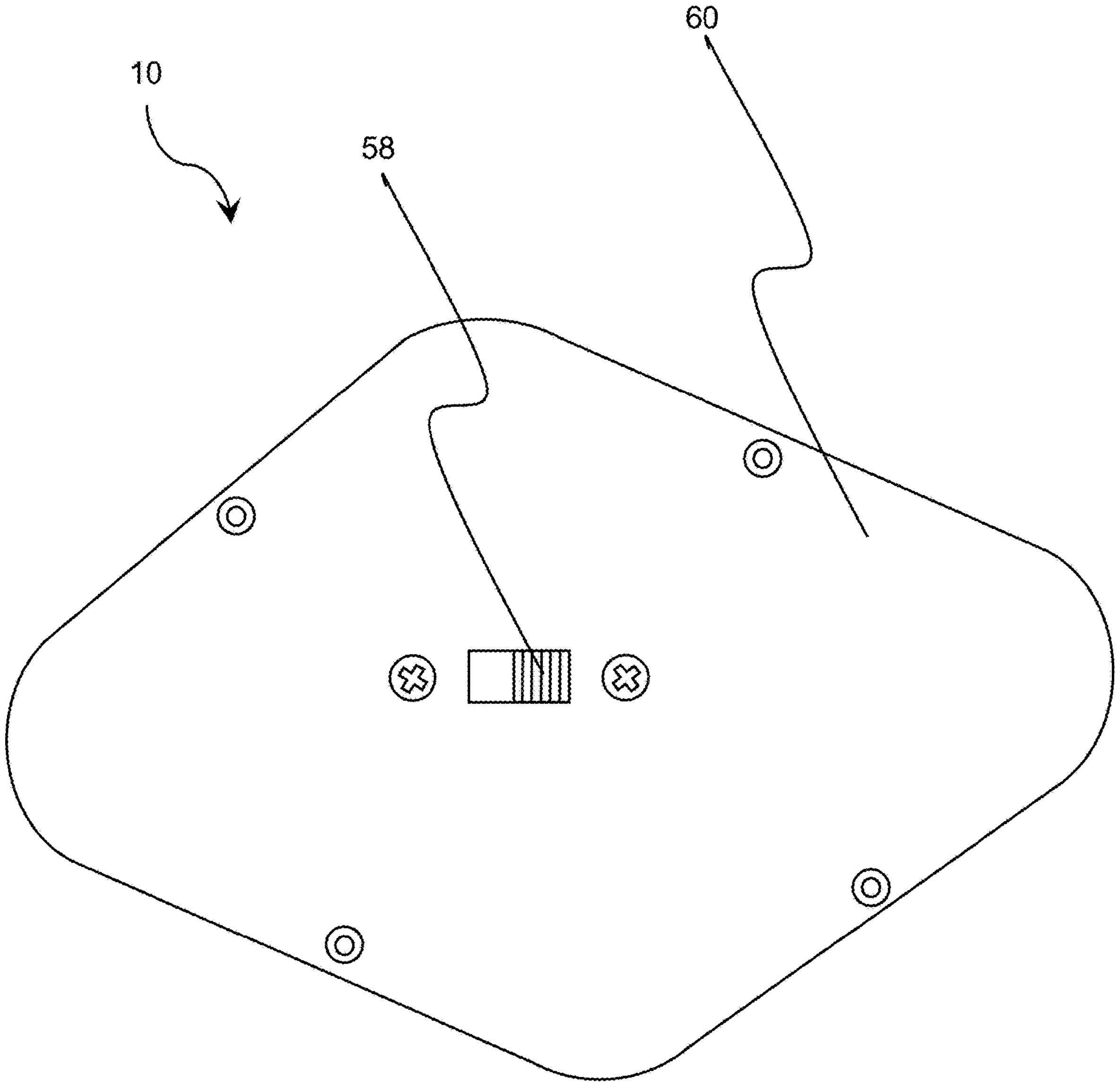
FIG. 8 is a top view of a slide switch of the coil switching control system for the electric guitar according to an embodiment of the present invention.
Figure 9:
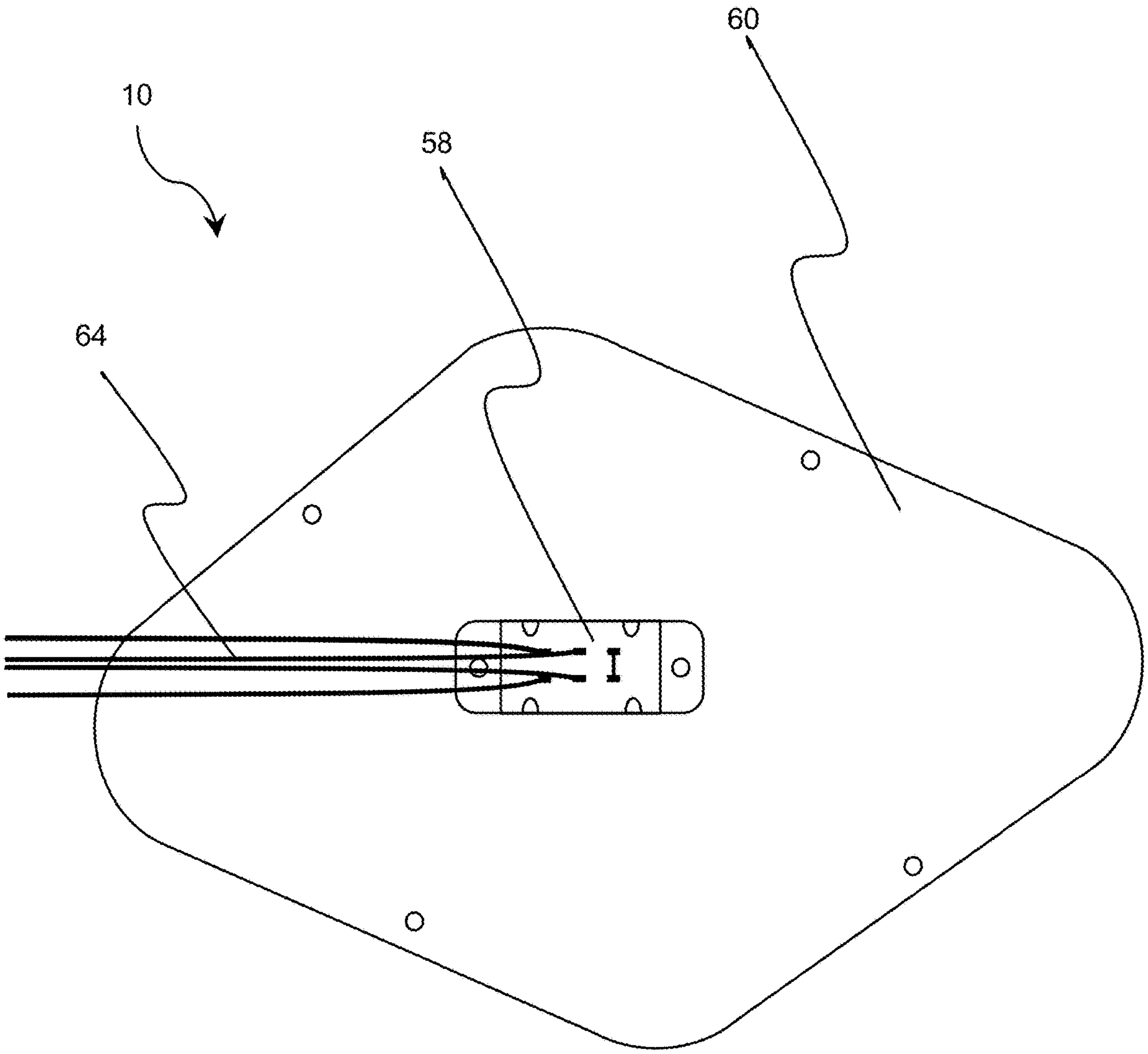
FIG. 9 is a bottom view of the slide switch of the coil switching control system for the electric guitar according to an embodiment of the present invention.
Figure 10:
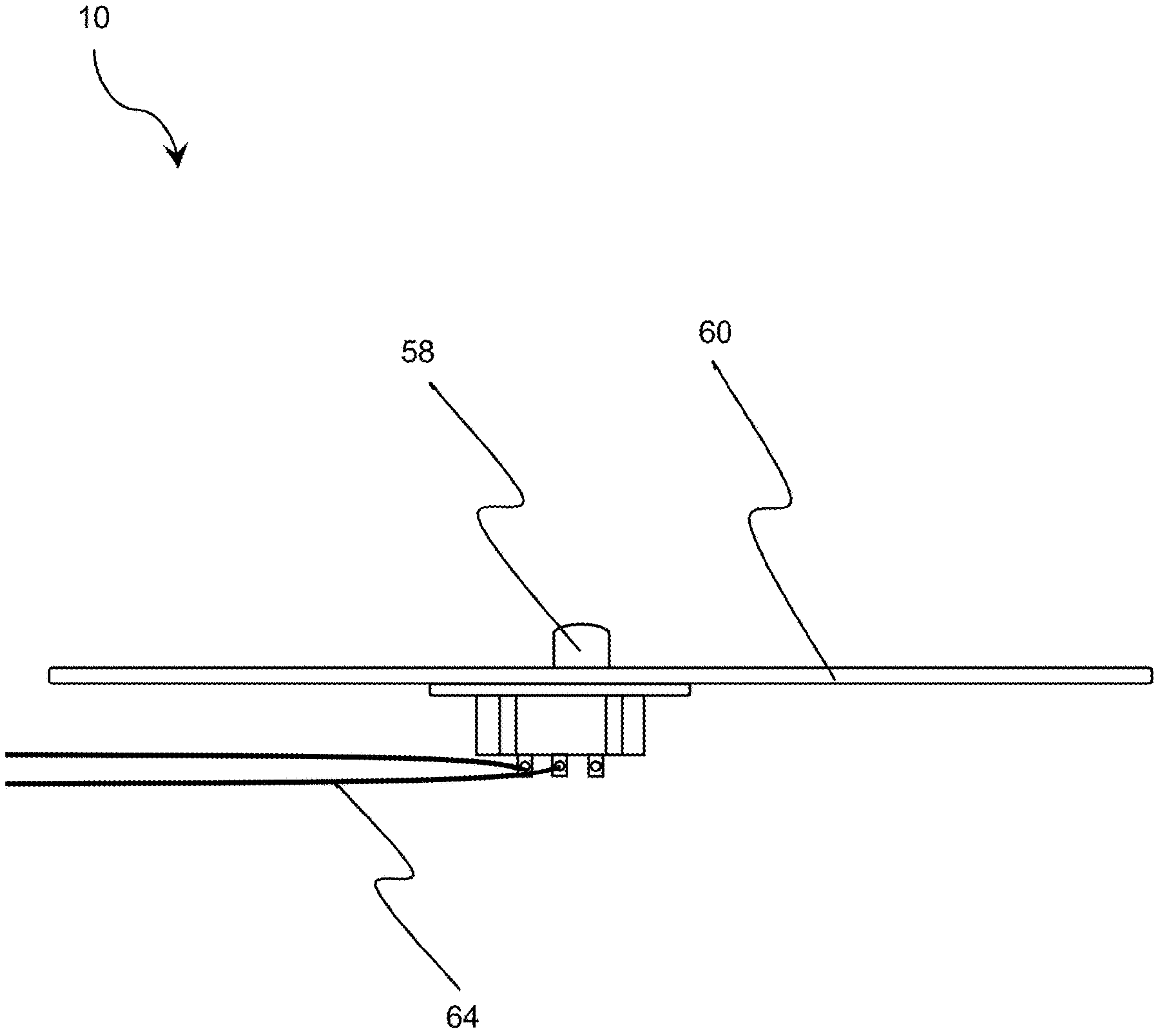
FIG. 10 is a side view of the slide switch of the coil switching control system for the electric guitar according to an embodiment of the present invention.
Figure 11:
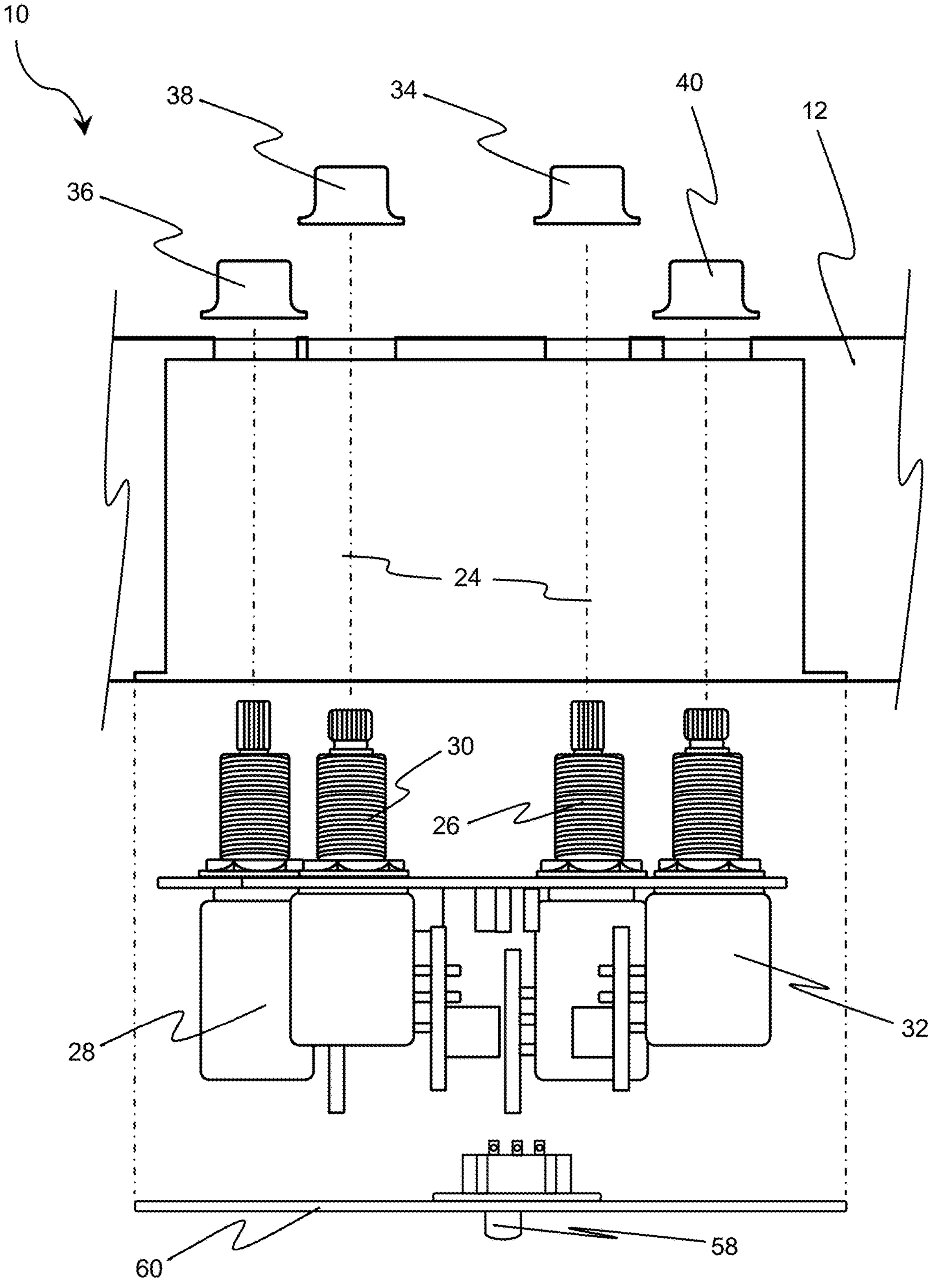
FIG. 11 is a side exploded view of the coil switching control system for the electric guitar according to an embodiment of the present invention.
Figure 12:
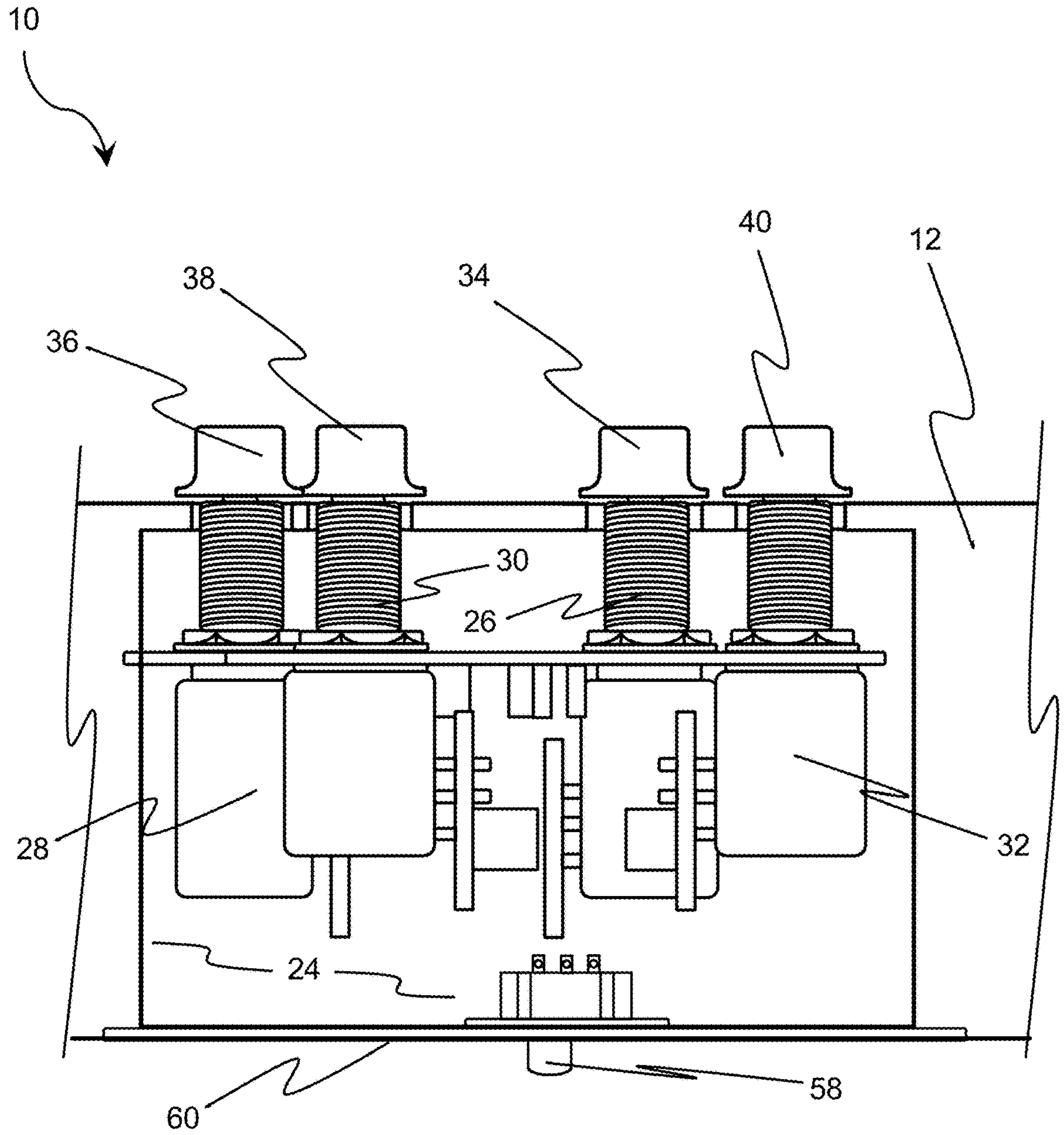
FIG. 12 is a side view of the coil switching control system for the electric guitar according to an embodiment of the present invention.
Figure 13:
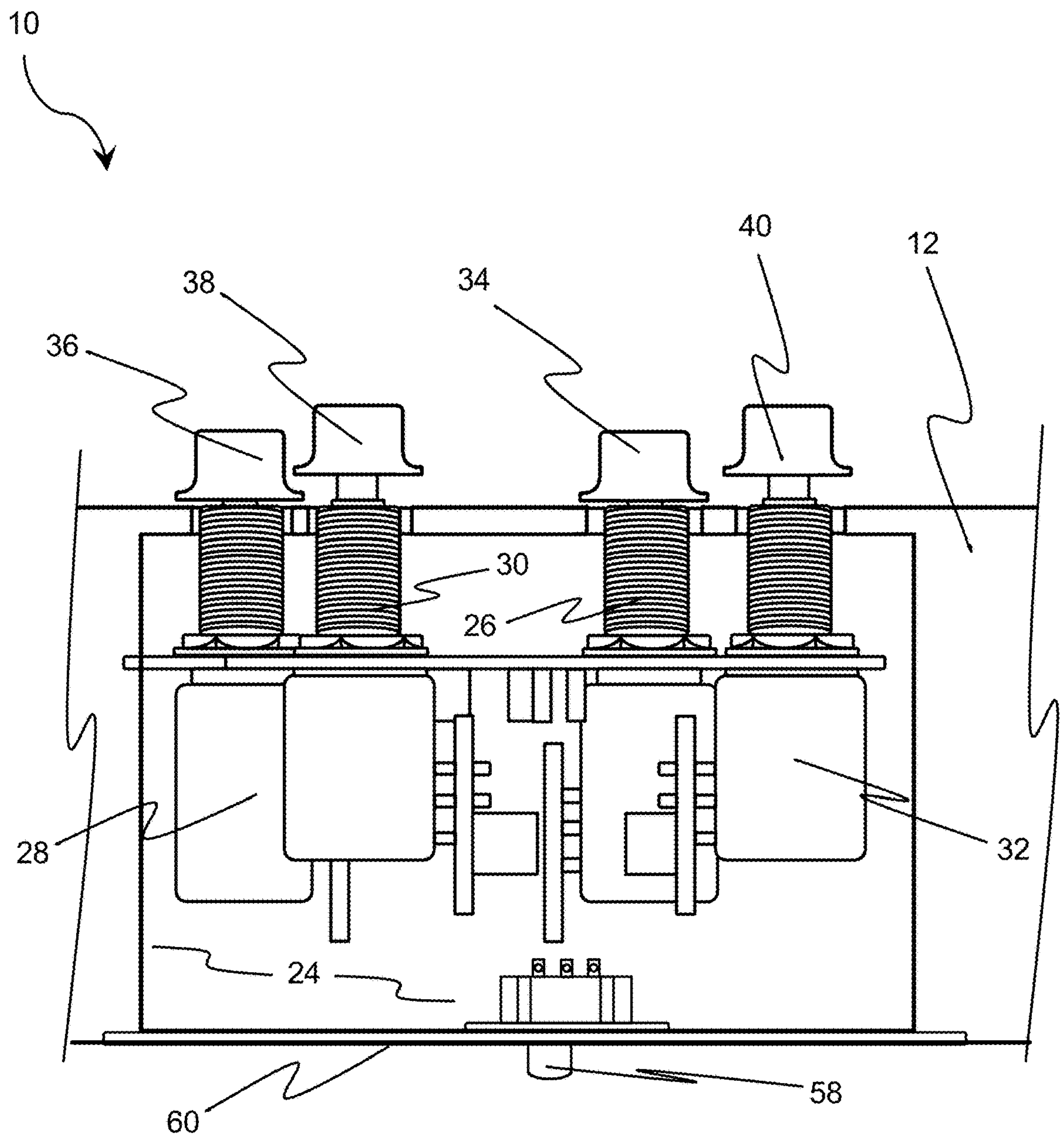
FIG. 13 is a side view of the coil switching control system for the electric guitar according to an embodiment of the present invention.

A typical electric guitar 12 is illustrated in FIGS. 1-2B. Guitar 12 includes a neck humbucker pickup 14 secured adjacent a neck 16 and a bridge humbucker pickup 18 secured adjacent a bridge 20. Neck humbucker pickup 14 includes two coils and bridge humbucker pickup 18 includes two coils. Electric guitars use the coil pickups of the neck and the bridge to convert the vibrations of the strings into electrical signals that are sent to an output amplifier and converted to musical notes. Each of neck humbucker pickup 14 and bridge humbucker pickup 18 may be well known popular pickup types used throughout the electric guitar industry that utilizes two wire coils to cancel out electromagnetic interference from single wire coils. Guitar 12 also includes a coil switching control system 10 according to an embodiment of the present invention.

Now referring to FIG. 2B-13, coil switching control system 10 will be described in further detail. System 10 includes a printed circuit board 22 that centralizes any wiring between components and may integrate solderless connectors for seamless installation. Circuit board 22 may be optimally sized to fit within a control cavity 24 of any model of Les Paul guitar bodies and any other applicable guitar bodies.

The components of coil switching control system 10 may be comprised of a neck rotary switch 26 and a bridge rotary switch 28 and a volume push-pull potentiometer 32 and a tone push-pull potentiometer 30 according to an embodiment of the present invention. Each of rotary switches 26 and 28 are fixedly secured to circuit board 22 and neck rotary switch 26 controls neck humbucker pickup 14 and bridge rotary switch 28 controls bridge humbucker pickup 18. Rotary switches 26 and 28 may be of the 4-pole 5-position design or any other typical rotary switch that may be used with any typical string electric instrument. Rotary switches 26 and 28 each enable control of neck humbucker pickup 14 and bridge humbucker pickup 18, respectively, to allow for coil tapping for single-coil-style sounds, normal-phase and reverse phase wiring for diverse tonal textures, parallel wiring for crisp, bright tones, and series wiring for high-output, full bodied sounds. Rotary switches 26 and 28 may include dials 34 and 36, respectively, as illustrated in FIGS. 1A and 12-14. Dials 34 and 36 along with rotary switches 26 and 28 may be rotated to various positions to change control of neck humbucker pickup 14 and bridge humbucker pickup 18 as described above.

Each of push-pull potentiometers 30 and 32 are fixedly secured to circuit board 22 and potentiometer 32 may be used to control the master volume and potentiometer 30 may be used for master tone control. Potentiometers 30 and 32 may be of the 500K audio taper design or any other typical potentiometer that may be used with any typical string electric instrument. Each of potentiometers 30 and 32 are mounted to circuit board 22 in a manner the enables the coils of neck humbucker pickup 14 or bridge humbucker pickup 18 to be put into a series and a normal phase configuration thereby producing a robust and more powerful pickup tone. Each of potentiometers 30 and 32 include an attached printed circuit board 42, 44 with a 4-position header 46, 48 to connect to an applicable 4-position header 50, 52 on circuit board 22 using a 4-wire cable 54, 56. (See FIGS. 2B & 3). Potentiometers 30 and 32 may include knobs 38 and 40, respectively, as illustrated in FIGS. 1A and 12-14. Knobs 38 and 40 along with push-pull potentiometers 30 and 32 may be pushed in (See FIG. 12) or pulled out (See FIG. 13) to enable the coils of neck humbucker pickup 14 or bridge humbucker pickup 18 to be put into the series and the normal phase configuration described above. Knob 38 and push-pull potentiometer 30 may also be rotated in a clockwise and counterclockwise direction to adjust the tone of the sound produced by electric guitar 12. Knob 40 and push-pull potentiometer 32 may also be rotated in a clockwise and counterclockwise direction to adjust the volume of sound produced by electric guitar 12. Coil switching control system 10 may also include a treble bleed circuit to enable high frequencies to bypass push-pull potentiometer 32 and pass directly to the output amplifier as knob 40 and push-pull potentiometer 32 are rotated to lower the volume of the sound produced by electric guitar 12, thereby preventing the tone of electric guitar 12 from getting dull.

Coil switching control system 10 may also include a slide switch 58 that may be mounted to a cavity plate 60 and connected to circuit board 22 by a 4-wire cable 62 at terminal block 64 (See FIG. 2B) according to an embodiment of the present invention. Slide switch 58 may be used to select either a standard/parallel choice for 35 pickup tones or an enhanced/series choice to place select neck humbucker pickup coils 14 or bridge humbucker pickup coils 18 in series for an additional 16 pickup tones for a total of 51 pickup tonal combinations. Cavity plate 60 may be secured to a rear face of guitar as shown in FIGS. 2, 2A and 11-13. Alternatively, slide switch 58 may be omitted from coil switching control system 10. If slide switch 58 is removed, terminal block 64 may be jumpered to provide only the standard/parallel choice for 35 pickup tonal combinations.

Figure 14:
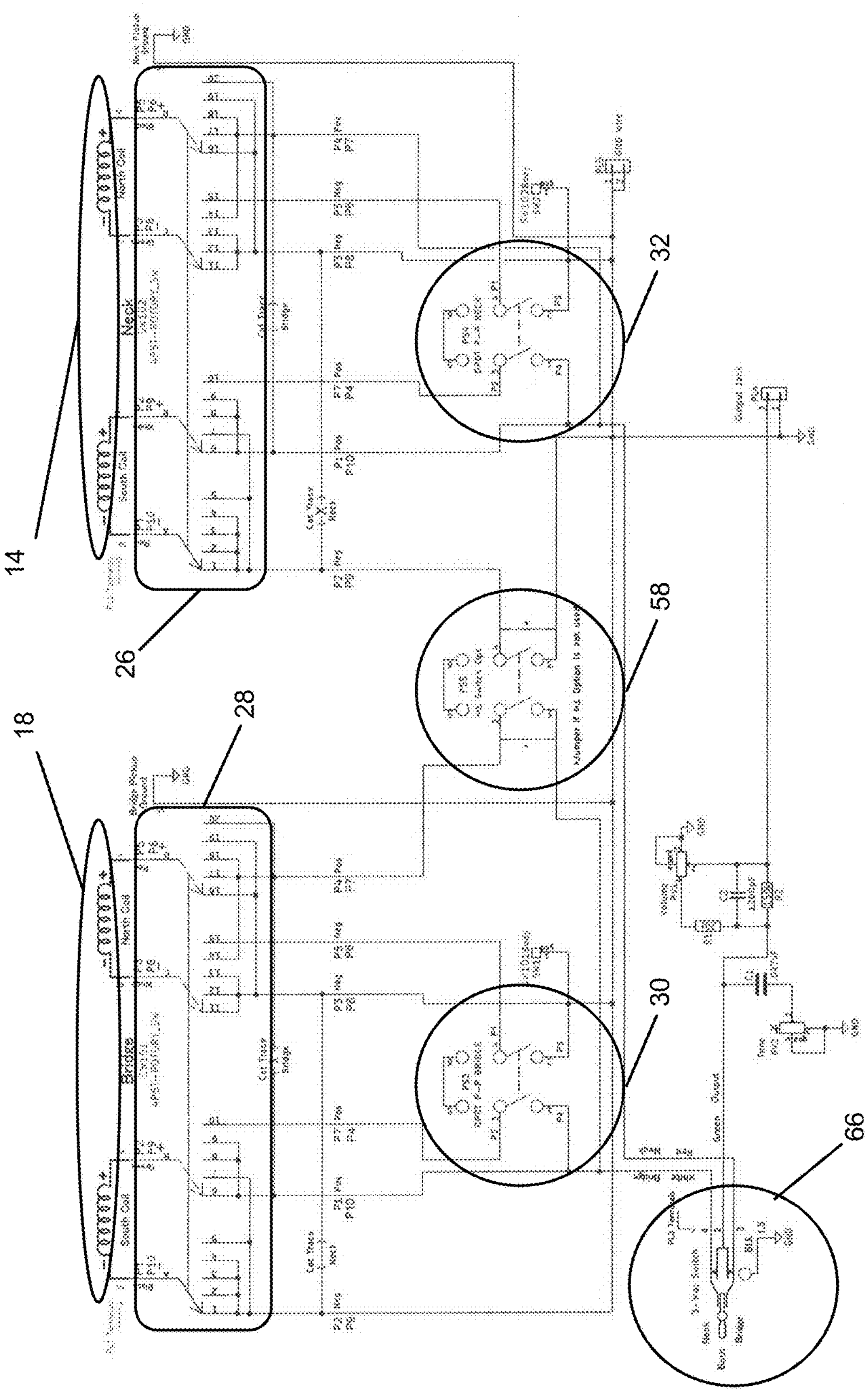
FIG. 14 is an electrical schematic of the coil switching control system for the electric guitar according to an embodiment of the present invention.
Figure 15:
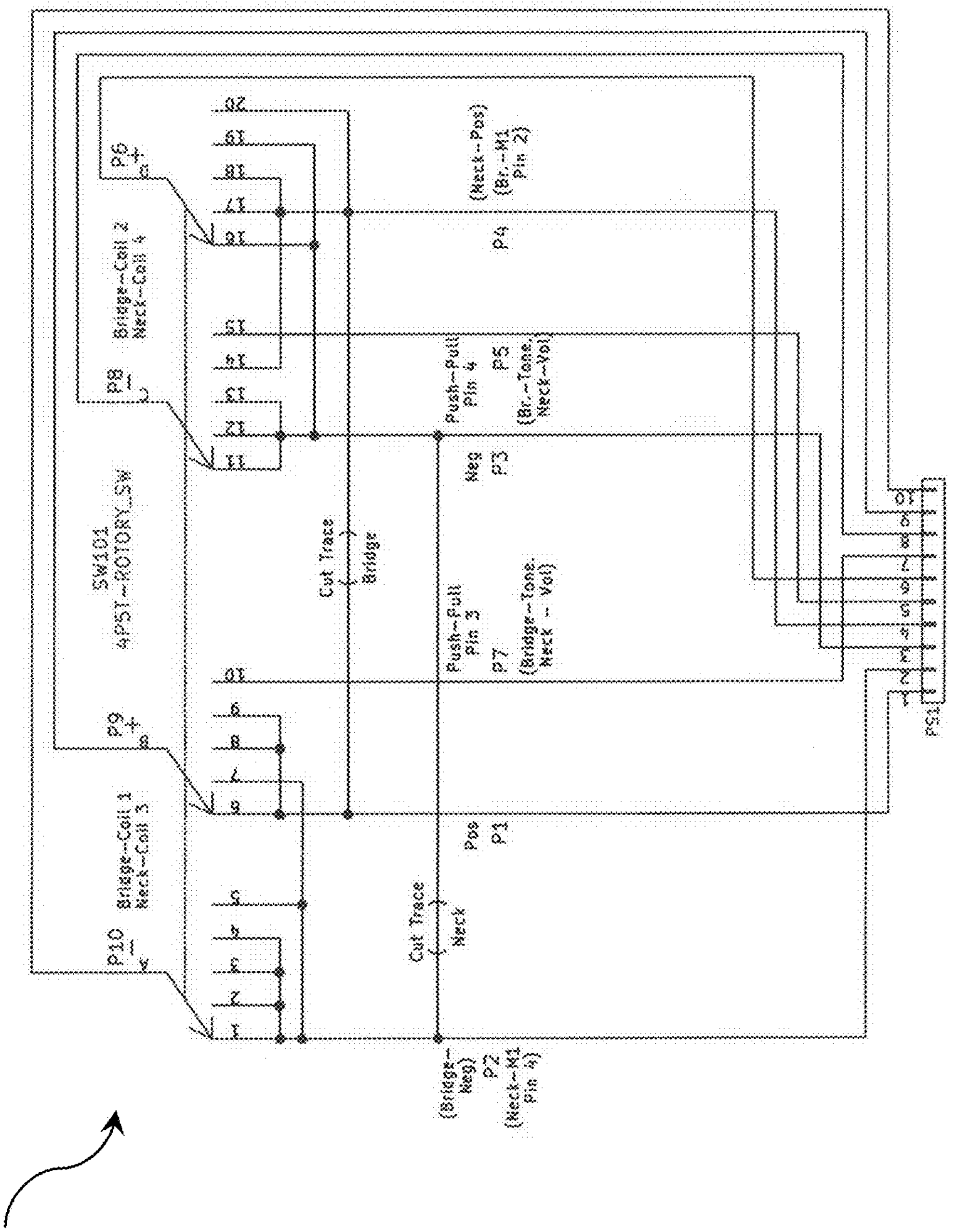
FIG. 15 is an electrical schematic of multi-position rotary switches of the coil switching control system for the electric guitar according to an embodiment of the present invention.
Figure 16:
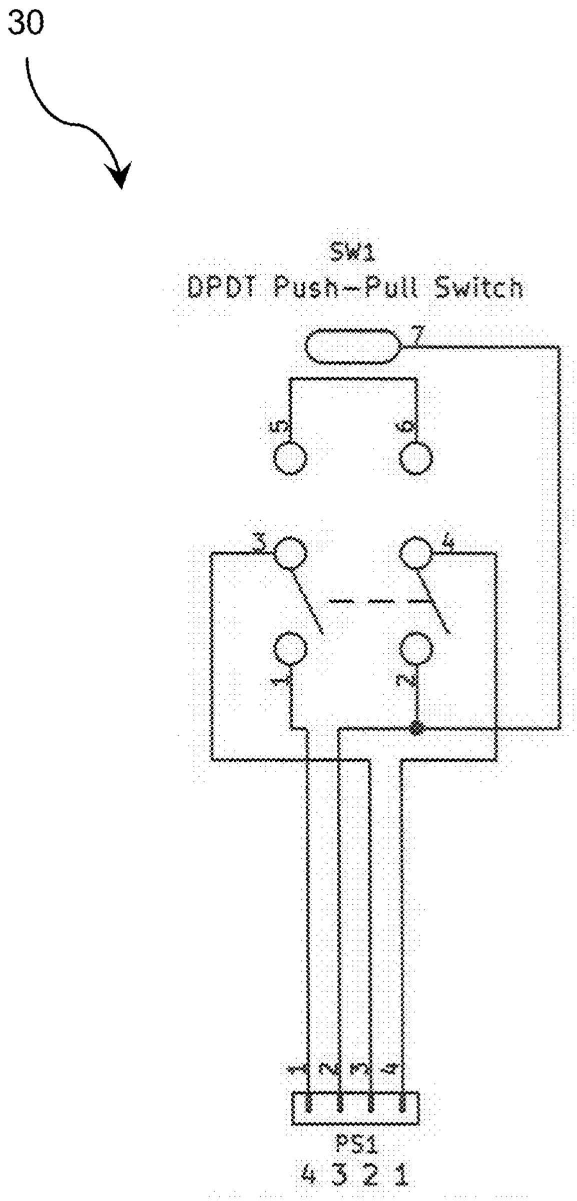
FIG. 16 is an electrical schematic of a push-pull switch of the coil switching control system for the electric guitar according to an embodiment of the present invention.

Now referring to FIGS. 14-16, wiring schematics of coil switching control system 10 are provided according to an embodiment of the present invention. FIG. 14 is a full wiring schematic of coil switching control system 10. FIG. 15 illustrates the wiring schematic for rotary switch 26 or 28 and FIG. 16 illustrates a wiring diagram for a push-pull potentiometer 30 or 32.

According to an embodiment of the present invention, coil switching control system 10 enables the combination of the two 5-position rotary switches 26 and 28, the two push-pull potentiometers 30 and 32, the slide switch 58, and an existing 3-way switch 66 (3-way switch 66 allows the player to select which signals from neck humbucker pickup 14, bridge humbucker pickup 18 or both are sent to the output amplifier) of the instrument to produce 51 different pickup tonal combinations to enhance a player's creative control of the instrument.

Referring now to FIGS. 1-16, each of the 51 pickup coil combinations provided according to an embodiment of the present invention will be described below. Tonal combination one is achieved with bridge rotary switch 28 in position 1 to enable the bridge humbucker pickup 18 south pickup coil in parallel and normal phase. The 3-way switch 66 is in the bridge position and slide switch 58 is in the standard position. Tonal combination two is achieved with bridge rotary switch 28 in position 2 to enable the bridge humbucker pickup 18 north pickup coil in parallel and normal phase. The 3-way switch 66 is in the bridge position and slide switch 58 is in the standard position. Tonal combination three is achieved with bridge rotary switch 28 in position 3 to enable the bridge humbucker pickup 18 south pickup coil and north pickup coil in parallel and normal phase. The 3-way switch 66 is in the bridge position and slide switch 58 is in the standard position. Tonal combination four is achieved with bridge rotary switch 28 in position 4 to enable the bridge humbucker pickup 18 south pickup coil and north pickup coil in parallel and reverse phase. The 3-way switch 66 is in the bridge position and slide switch 58 is in the standard position. Tonal combination five is achieved with bridge rotary switch 28 in position 5 to enable the bridge humbucker pickup 18 south pickup coil and north pickup coil in series and normal phase. The 3-way switch 66 is in the bridge position, slide switch 58 is in the standard position, and tone push-pull potentiometer 30 and knob 38 are in the up position. (See FIG. 13 for tone push-pull potentiometer 30 and knob 38 in the up position).

Tonal combination six is achieved with neck rotary switch 26 in position 1 to enable the neck humbucker pickup 14 south pickup coil in parallel and normal phase. The 3-way switch 66 is in the neck position and slide switch 58 is in the standard position. Tonal combination seven is achieved with neck rotary switch 26 in position 2 to enable the neck humbucker pickup 14 north pickup coil in parallel and normal phase. The 3-way switch 66 is in the neck position and slide switch 58 is in the standard position. Tonal combination eight is achieved with neck rotary switch 26 in position 3 to enable the neck humbucker pickup 14 south pickup coil and north pickup coil in parallel and normal phase. The 3-way switch 66 is in the neck position and slide switch 58 is in the standard position. Tonal combination nine is achieved with neck rotary switch 26 in position 4 to enable the neck humbucker pickup 14 south pickup coil and north pickup coil in parallel and reverse phase. The 3-way switch 66 is in the neck position and slide switch 58 is in the standard position. Tonal combination 10 is achieved with neck rotary switch 26 in position 5 to enable the neck humbucker pickup 14 south pickup coil and north pickup coil in series and normal phase. The 3-way switch 66 is in the neck position, slide switch 58 is in the standard position, and volume push-pull potentiometer 32 and knob 40 are in the up position. (See FIG. 13 for volume push-pull potentiometer 32 and knob 40 in the up position).

Tonal combination 11 is achieved with bridge rotary switch 28 in position 1 to enable the bridge humbucker pickup 18 south pickup coil in parallel and normal phase. Neck rotary switch 26 is in position 1 to enable the neck humbucker pickup 14 south pickup coil in parallel and normal phase. The 3-way switch 66 is in the middle position and slide switch 58 is in the standard position. Tonal combination 12 is achieved with bridge rotary switch 28 in position 1 to enable the bridge humbucker pickup 18 south pickup coil in parallel and normal phase. Neck rotary switch 26 is in position 2 to enable the neck humbucker pickup 14 north pickup coil in parallel and normal phase. The 3-way switch 66 is in the middle position and slide switch 58 is in the standard position. Tonal combination 13 is achieved with bridge rotary switch 28 in position 1 to enable the bridge humbucker pickup 18 south pickup coil in parallel and normal phase. Neck rotary switch 26 is in position 3 to enable the neck humbucker pickup 14 south pickup coil and north pickup coil in parallel and normal phase. The 3-way switch 66 is in the middle position and slide switch 58 is in the standard position. Tonal combination 14 is achieved with bridge rotary switch 28 in position 1 to enable the bridge humbucker pickup 18 south pickup coil in parallel and normal phase. Neck rotary switch 26 is in position 4 to enable the neck humbucker pickup 14 south pickup coil and north pickup coil in parallel and reverse phase. The 3-way switch 66 is in the middle position and slide switch 58 is in the standard position. Tonal combination 15 is achieved with bridge rotary switch 28 in position 1 to enable the bridge humbucker pickup 18 south pickup coil in parallel and normal phase. Neck rotary switch 26 is in position 5 to enable the neck humbucker pickup 14 south pickup coil and north pickup coil in series and normal phase. The 3-way switch 66 is in the middle position, slide switch 58 is in the standard position, and volume push-pull potentiometer 32 and knob 40 are in the up position.

Tonal combination 16 is achieved with bridge rotary switch 28 in position 2 to enable the bridge humbucker pickup 18 north pickup coil in parallel and normal phase. Neck rotary switch 26 is in position 1 to enable the neck humbucker pickup 14 south pickup coil in parallel and normal phase. The 3-way switch 66 is in the middle position and slide switch 58 is in the standard position. Tonal combination 17 is achieved with bridge rotary switch 28 in position 2 to enable the bridge humbucker pickup 18 north pickup coil in parallel and normal phase. Neck rotary switch 26 is in position 2 to enable the neck humbucker pickup 14 north pickup coil in parallel and normal phase. The 3-way switch 66 is in the middle position and slide switch 58 is in the standard position. Tonal combination 18 is achieved with bridge rotary switch 28 in position 2 to enable the bridge humbucker pickup 18 north pickup coil in parallel and normal phase. Neck rotary switch 26 is in position 3 to enable the neck humbucker pickup 14 south pickup coil and north pickup coil in parallel and normal phase. The 3-way switch 66 is in the middle position and slide switch 58 is in the standard position. Tonal combination 19 is achieved with bridge rotary switch 28 in position 2 to enable the bridge humbucker pickup 18 north pickup coil in parallel and normal phase. Neck rotary switch 26 is in position 4 to enable the neck humbucker pickup 14 south pickup coil and north pickup coil in parallel and reverse phase. The 3-way switch 66 is in the middle position and slide switch 58 is in the standard position. Tonal combination 20 is achieved with bridge rotary switch 28 in position 2 to enable the bridge humbucker pickup 18 north pickup coil in parallel and normal phase. Neck rotary switch 26 is in position 5 to enable the neck humbucker pickup 14 south pickup coil and north pickup coil in series and normal phase. The 3-way switch 66 is in the middle position, slide switch 58 is in the standard position, and volume push-pull potentiometer 32 and knob 40 are in the up position.

Tonal combination 21 is achieved with bridge rotary switch 28 in position 3 to enable the bridge humbucker pickup 18 south pickup coil and north pickup coil in parallel and normal phase. Neck rotary switch 26 is in position 1 to enable the neck humbucker pickup 14 south pickup coil in parallel and normal phase. The 3-way switch 66 is in the middle position and slide switch 58 is in the standard position. Tonal combination 22 is achieved with bridge rotary switch 28 in position 3 to enable the bridge humbucker pickup 18 south pickup coil and north pickup coil in parallel and normal phase. Neck rotary switch 26 is in position 2 to enable the neck humbucker pickup 14 north pickup coil in parallel and normal phase. The 3-way switch 66 is in the middle position and slide switch 58 is in the standard position. Tonal combination 23 is achieved with bridge rotary switch 28 in position 3 to enable the bridge humbucker pickup 18 south pickup coil and north pickup coil in parallel and normal phase. Neck rotary switch 26 is in position 3 to enable the neck humbucker pickup 14 south pickup coil and north pickup coil in parallel and normal phase. The 3-way switch 66 is in the middle position and slide switch 58 is in the standard position. Tonal combination 24 is achieved with bridge rotary switch 28 in position 3 to enable the bridge humbucker pickup 18 south pickup coil and north pickup coil in parallel and normal phase. Neck rotary switch 26 is in position 4 to enable the neck humbucker pickup 14 south pickup coil and north pickup coil in parallel and reverse phase. The 3-way switch 66 is in the middle position and slide switch 58 is in the standard position. Tonal combination 25 is achieved with bridge rotary switch 28 in position 3 to enable the bridge humbucker pickup 18 south pickup coil and north pickup coil in parallel and normal phase. Neck rotary switch 26 is in position 5 to enable the neck humbucker pickup 14 south pickup coil and north pickup coil in series and normal phase. The 3-way switch 66 is in the middle position, slide switch 58 is in the standard position, and volume push-pull potentiometer 32 and knob 40 are in the up position.

Tonal combination 26 is achieved with bridge rotary switch 28 in position 4 to enable the bridge humbucker pickup 18 south pickup coil and north pickup coil in parallel and reverse phase. Neck rotary switch 26 is in position 1 to enable the neck humbucker pickup 14 south pickup coil in parallel and normal phase. The 3-way switch 66 is in the middle position and slide switch 58 is in the standard position. Tonal combination 27 is achieved with bridge rotary switch 28 in position 4 to enable the bridge humbucker pickup 18 south pickup coil and north pickup coil in parallel and reverse phase. Neck rotary switch 26 is in position 2 to enable the neck humbucker pickup 14 north pickup coil in parallel and normal phase. The 3-way switch 66 is in the middle position and slide switch 58 is in the standard position. Tonal combination 28 is achieved with bridge rotary switch 28 in position 4 to enable the bridge humbucker pickup 18 south pickup coil and north pickup coil in parallel and reverse phase. Neck rotary switch 26 is in position 3 to enable the neck humbucker pickup 14 south pickup coil and north pickup coil in parallel and normal phase. The 3-way switch 66 is in the middle position and slide switch 58 is in the standard position. Tonal combination 29 is achieved with bridge rotary switch 28 in position 4 to enable the bridge humbucker pickup 18 south pickup coil and north pickup coil in parallel and reverse phase. Neck rotary switch 26 is in position 4 to enable the neck humbucker pickup 14 south pickup coil and north pickup coil in parallel and reverse phase. The 3-way switch 66 is in the middle position and slide switch 58 is in the standard position. Tonal combination 30 is achieved with bridge rotary switch 28 in position 4 to enable the bridge humbucker pickup 18 south pickup coil and north pickup coil in parallel and reverse phase. Neck rotary switch 26 is in position 5 to enable the neck humbucker pickup 14 south pickup coil and north pickup coil in series and normal phase. The 3-way switch 66 is in the middle position, slide switch 58 is in the standard position, and volume push-pull potentiometer 32 and knob 40 are in the up position.

Tonal combination 31 is achieved with bridge rotary switch 28 in position 5 to enable the bridge humbucker pickup 18 south pickup coil and north pickup coil in series and normal phase. Neck rotary switch 26 is in position 1 to enable the neck humbucker pickup 14 south pickup coil in parallel and normal phase. The 3-way switch 66 is in the middle position, slide switch 58 is in the standard position, and tone push-pull potentiometer 30 and knob 38 are in the up position. Tonal combination 32 is achieved with bridge rotary switch 28 in position 5 to enable the bridge humbucker pickup 18 south pickup coil and north pickup coil in series and normal phase. Neck rotary switch 26 is in position 2 to enable the neck humbucker pickup 14 north pickup coil in parallel and normal phase. The 3-way switch 66 is in the middle position, slide switch 58 is in the standard position, and tone push-pull potentiometer 30 and knob 38 are in the up position. Tonal combination 33 is achieved with bridge rotary switch 28 in position 5 to enable the bridge humbucker pickup 18 south pickup coil and north pickup coil in series and normal phase. Neck rotary switch 26 is in position 3 to enable the neck humbucker pickup 14 south pickup coil and north pickup coil in parallel and normal phase. The 3-way switch 66 is in the middle position, slide switch 58 is in the standard position, and tone push-pull potentiometer 30 and knob 38 are in the up position. Tonal combination 34 is achieved with bridge rotary switch 28 in position 5 to enable the bridge humbucker pickup 18 south pickup coil and north pickup coil in series and normal phase. Neck rotary switch 26 is in position 4 to enable the neck humbucker pickup 14 south pickup coil and north pickup coil in parallel and reverse phase. The 3-way switch 66 is in the middle position, slide switch 58 is in the standard position, and tone push-pull potentiometer 30 and knob 38 are in the up position. Tonal combination 35 is achieved with bridge rotary switch 28 in position 5 to enable the bridge humbucker pickup 18 south pickup coil and north pickup coil in series and normal phase. Neck rotary switch 26 is in position 5 to enable the neck humbucker pickup 14 south pickup coil and north pickup coil in series and normal phase. The 3-way switch 66 is in the middle position, slide switch 58 is in the standard position, tone push-pull potentiometer 30 and knob 38 are in the up position, and volume push-pull potentiometer 32 and knob 40 are in the up position.

Tonal combination 36 is achieved with bridge rotary switch 28 in position 2 to enable the bridge humbucker pickup 18 north pickup coil in parallel and normal phase. Neck rotary switch 26 is in position 1 to enable the neck humbucker pickup 14 south pickup coil in parallel and normal phase. The 3-way switch 66 is in the middle position and slide switch 58 is in the series position. Tonal combination 37 is achieved with bridge rotary switch 28 in position 3 to enable the bridge humbucker pickup 18 south pickup coil and north pickup coil in parallel and normal phase. Neck rotary switch 26 is in position 1 to enable the neck humbucker pickup 14 south pickup coil in parallel and normal phase. The 3-way switch 66 is in the middle position and slide switch 58 is in the series position. Tonal combination 38 is achieved with bridge rotary switch 28 in position 4 to enable the bridge humbucker pickup 18 south pickup coil and north pickup coil in parallel and reverse phase. Neck rotary switch 26 is in position 1 to enable the neck humbucker pickup 14 south pickup coil in parallel and normal phase. The 3-way switch 66 is in the middle position and slide switch 58 is in the series position. Tonal combination 39 is achieved with bridge rotary switch 28 in position 5 to enable the bridge humbucker pickup 18 south pickup coil and north pickup coil in series and normal phase. Neck rotary switch 26 is in position 1 to enable the neck humbucker pickup 14 south pickup coil in parallel and normal phase. The 3-way switch 66 is in the middle position, volume push-pull potentiometer 32 and knob 40 are in the up position, and slide switch 58 is in the series position.

Tonal combination 40 is achieved with bridge rotary switch 28 in position 2 to enable the bridge humbucker pickup 18 north pickup coil in parallel and normal phase. Neck rotary switch 26 is in position 3 to enable the neck humbucker pickup 14 south pickup coil and north pickup coil in parallel and normal phase. The 3-way switch 66 is in the middle position and slide switch 58 is in the series position. Tonal combination 41 is achieved with bridge rotary switch 28 in position 2 to enable the bridge humbucker pickup 18 north pickup coil in parallel and normal phase. Neck rotary switch 26 is in position 4 to enable the neck humbucker pickup 14 south pickup coil and north pickup coil in parallel and reverse phase. The 3-way switch 66 is in the middle position and slide switch 58 is in the series position. Tonal combination 42 is achieved with bridge rotary switch 28 in position 2 to enable the bridge humbucker pickup 18 north pickup coil in parallel and normal phase. Neck rotary switch 26 is in position 5 to enable the neck humbucker pickup 14 south pickup coil and north pickup coil in series and normal phase. The 3-way switch 66 is in the middle position, volume push-pull potentiometer 32 and knob 40 are in the up position, and slide switch 58 is in the series position.

Tonal combination 43 is achieved with bridge rotary switch 28 in position 3 to enable the bridge humbucker pickup 18 south pickup coil and north pickup coil in parallel and normal phase. Neck rotary switch 26 is in position 3 to enable the neck humbucker pickup 14 south pickup coil and north pickup coil in parallel and normal phase. The 3-way switch 66 is in the middle position and slide switch 58 is in the series position. Tonal combination 44 is achieved with bridge rotary switch 28 in position 4 to enable the bridge humbucker pickup 18 south pickup coil and north pickup coil in parallel and reverse phase. Neck rotary switch 26 is in position 3 to enable the neck humbucker pickup 14 south pickup coil and north pickup coil in parallel and normal phase. The 3-way switch 66 is in the middle position and slide switch 58 is in the series position. Tonal combination 45 is achieved with bridge rotary switch 28 in position 5 to enable the bridge humbucker pickup 18 south pickup coil and north pickup coil in series and normal phase. Neck rotary switch 26 is in position 3 to enable the neck humbucker pickup 14 south pickup coil and north pickup coil in parallel and normal phase. The 3-way switch 66 is in the middle position, tone push-pull potentiometer 30 and knob 38 are in the up position and slide switch 58 is in the series position.

Tonal combination 46 is achieved with bridge rotary switch 28 in position 3 to enable the bridge humbucker pickup 18 south pickup coil and north pickup coil in parallel and normal phase. Neck rotary switch 26 is in position 4 to enable the neck humbucker pickup 14 south pickup coil and north pickup coil in parallel and reverse phase. The 3-way switch 66 is in the middle position and slide switch 58 is in the series position. Tonal combination 47 is achieved with bridge rotary switch 28 in position 4 to enable the bridge humbucker pickup 18 south pickup coil and north pickup coil in parallel and reverse phase. Neck rotary switch 26 is in position 4 to enable the neck humbucker pickup 14 south pickup coil and north pickup coil in parallel and reverse phase. The 3-way switch 66 is in the middle position and slide switch 58 is in the series position. Tonal combination 48 is achieved with bridge rotary switch 28 in position 5 to enable the bridge humbucker pickup 18 south pickup coil and north pickup coil in series and normal phase. Neck rotary switch 26 is in position 4 to enable the neck humbucker pickup 14 south pickup coil and north pickup coil in parallel and reverse phase. The 3-way switch 66 is in the middle position, tone push-pull potentiometer 30 and knob 38 are in the up position, and slide switch 58 is in the series position.

Tonal combination 49 is achieved with bridge rotary switch 28 in position 3 to enable the bridge humbucker pickup 18 south pickup coil and north pickup coil in parallel and normal phase. Neck rotary switch 26 is in position 5 to enable the neck humbucker pickup 14 south pickup coil and north pickup coil in series and normal phase. The 3-way switch 66 is in the middle position, volume push-pull potentiometer 32 and knob 40 are in the up position, and slide switch 58 is in the series position. Tonal combination 50 is achieved with bridge rotary switch 28 in position 4 to enable the bridge humbucker pickup 18 south pickup coil and north pickup coil in parallel and reverse phase. Neck rotary switch 26 is in position 5 to enable the neck humbucker pickup 14 south pickup coil and north pickup coil in series and normal phase. The 3-way switch 66 is in the middle position, volume push-pull potentiometer 32 and knob 40 are in the up position, and slide switch 58 is in the series position. Tonal combination 51 is achieved with bridge rotary switch 28 in position 5 to enable the bridge humbucker pickup 18 south pickup coil and north pickup coil in series and normal phase. Neck rotary switch 26 is in position 5 to enable the neck humbucker pickup 14 south pickup coil and north pickup coil in series and normal phase. The 3-way switch 66 is in the middle position, tone push-pull potentiometer 30 and knob 38 are in the up position, volume push-pull potentiometer 32 and knob 40 are in the up position, and slide switch 58 is in the series position. This control combination provides for a QuadraBucker pickup tone—all four coils are in normal phase and in series.

The present invention has been particularly shown and described with reference to the foregoing embodiments, which are merely illustrative of the best modes presently known for carrying out the invention. It should be understood by those skilled in the art that various alternatives to the embodiments of the invention described herein may be employed in practicing the invention without departing from the spirit and scope of the invention as defined in the following claims. It is intended that the following claims define the scope of the invention and that the method within the scope of these claims and their equivalents be covered thereby. This description of the invention should be understood to include all novel and non-obvious combination of elements described herein, and claims may be presented in this or a later application to any novel non-obvious combination of these elements. Moreover, the foregoing embodiments are illustrative, and no single feature or element is essential to all possible combinations that may be claimed in this or a later application.

What is claimed is:

1. A coil switching control system for an electric guitar, comprising:

a printed circuit board sized to be secured within a control cavity of said electric guitar;

a first multi-position rotary switch, said first multi-position rotary switch fixedly secured to said printed circuit board and controls a neck humbucker multi-coil pickup at a neck of said electric guitar, wherein said first multi-position rotary switch is rotated to different positions to enable an operation of different coil configurations of said neck humbucker multi-coil pickup, said coil configurations of said neck humbucker multi-coil pickup including at least:

a single coil in single coil mode;

both coils in parallel and normal phase;

both coils in parallel and reverse phase; and both coils in series and normal phase;

a second multi-position rotary switch, said second multi-position rotary switch fixedly secured to said printed circuit board and controls a bridge humbucker multi-coil pickup at a bridge of said electric guitar, wherein said second multi-position rotary switch is rotated to different positions to enable an operation of different coil configurations of said bridge humbucker multi-coil pickup, said coil configurations of said bridge humbucker multi-coil pickup including at least:

a single coil in single coil mode;

both coils in parallel and normal phase;

both coils in parallel and reverse phase; and both coils in series and normal phase;

a first push-pull potentiometer; said first push pull potentiometer fixedly secured to said printed circuit board and controls a volume of said electric guitar;

a second push-pull potentiometer; said second push pull potentiometer fixedly secured to said printed circuit board and controls a tonal sound of said electric guitar; and an electrical circuit connecting said first multi-position rotary switch to said neck humbucker multi-coil pickup, said second multi-position rotary switch to said bridge humbucker multi-coil pickup, said first push-pull potentiometer and said second push-pull potentiometer to an output amplifier, the combination of said multi-position rotary switches and said push-pull potentiometers enables a selection of a multiplicity of coil configurations for said electric guitar.

2. The coil switching control system as recited in claim 1, wherein said coil switching control system further includes a slide switch mounted to a cavity plate, secured to said electric guitar at said control cavity, and electrically connected to said printed circuit board and said electric circuit, said slide switch being switchable between a standard/parallel position and an enhanced/series position, wherein said enhanced/series position places said neck humbucker multi-coil pickup or said bridge humbucker multi-coil pickup in series to provide for additional tonal combinations.

3. The coil switching control system as recited in claim 2, wherein said neck humbucker multi-coil pickup includes a south pickup coil and a north pickup coil.

4. The coil switching control system as recited in claim 3, wherein said bridge humbucker multi-coil pickup includes a south pickup coil and a north pickup coil.

5. The coil switching control system as recited in claim 4, wherein said first multi-position rotary switch includes five positions to enable different control configurations of said neck humbucker multi-coil pickup to allow for:

Position 1: said south pickup coil in single coil mode;

Position 2: said north pickup coil in single coil mode;

Position 3: said south pickup coil and said north pickup coil in parallel and normal phase;

Position 4: said south pickup coil and said north pickup coil in parallel and reverse phase; and Position 5: said south pickup coil and said north pickup coil in series and normal phase.

6. The coil switching control system as recited in claim 5, wherein said second multi-position rotary switch includes five positions to enable different control configurations of said bridge humbucker multi-coil pickup to allow for:

Position 1: said south pickup coil in single coil mode;

Position 2: said north pickup coil in single coil mode;

Position 3: said south pickup coil and said north pickup coil in parallel and normal phase;

Position 4: said south pickup coil and said north pickup coil in parallel and reverse phase; and Position 5: said south pickup coil and said north pickup coil in series and normal phase.

7. The coil switching control system as recited in claim 6, wherein the combination of said first multi-position rotary switch, said second multi-position rotary switch, said first push-pull potentiometer, said second push-pull potentiometer and a 3-way switch produces at least 35 different tonal combinations.

8. The coil switching control system as recited in claim 7, wherein the addition of said slide switch to said first multi-position rotary switch, said second multi-position rotary switch, said first push-pull potentiometer, said second push-pull potentiometer and said 3-way switch produces at least 51 different tonal combinations.

9. The coil switching control system as recited in claim 1, where said coil switching control system further includes a treble bleed circuit.

* * * * *